(12) United States Patent
Sales

(10) Patent No.: US 7,813,054 B2
(45) Date of Patent: Oct. 12, 2010

(54) OPTICAL ELEMENTS WITH SADDLE SHAPED STRUCTURES FOR DIFFUSING OR SHAPING LIGHT

(75) Inventor: Tasso R. M. Sales, Rochester, NY (US)

(73) Assignee: RPC Photonics, Inc., Rochester, NY (US)

( * ) Notice: Subject to any disclaimer, the term of this patent is extended or adjusted under 35 U.S.C. 154(b) by 11 days.

(21) Appl. No.: 12/002,137

(22) Filed: Dec. 14, 2007

(65) Prior Publication Data
US 2009/0153974 A1 Jun. 18, 2009

(51) Int. Cl.
G02B 13/20 (2006.01)
(52) U.S. Cl. ..................................... 359/707
(58) Field of Classification Search ................ 359/707
See application file for complete search history.

(56) References Cited

U.S. PATENT DOCUMENTS

| | | | |
|---|---|---|---|
| 3,482,906 A | 12/1969 | Volk | |
| 5,218,471 A | 6/1993 | Swanson et al. | |
| 5,285,517 A | 2/1994 | Wu | |
| 5,917,845 A | 6/1999 | Sales et al. | |
| 6,118,559 A | 9/2000 | Kathman et al. | |
| 6,250,777 B1 * | 6/2001 | Aoyama | 362/326 |
| 6,410,213 B1 | 6/2002 | Raguin et al. | |
| 6,859,326 B2 | 2/2005 | Sales | |
| 7,033,736 B2 | 4/2006 | Morris et al. | |
| 7,297,386 B2 | 11/2007 | Suzuki et al. | |
| 7,338,160 B2 * | 3/2008 | Lieberman et al. | 351/160 R |
| 2007/0218372 A1 | 9/2007 | Zalevsky et al. | |
| 2007/0284546 A1 | 12/2007 | Ryzi et al. | |
| 2008/0297910 A1 * | 12/2008 | Bhandari et al. | 359/648 |

OTHER PUBLICATIONS

Mendes, E. et al., Photofabrication of random archromatic optical diffusers for uniform illumination, Applied Optics, vol. 40, No. 7, pp. 1098-1108, Mar. 1, 2001.
Buttner, A. et al., Wave optical analysis of light-emitting diode beam shaping using microlens arrays, Opt. Eng. 41 (10) 2393-2401, Oct. 2002.
D. R. Brown, Beam shaping with diffractive diffusers in Laser Beam Shaping, New York, 2005, pp. 249-271, Chap. 6.
J.W. Goodman, Introduction to Fourier Optics, McGraw-Hill, 1968, pp. 73-81.
K. D. Bonin et al., Simple diffuser for production of laser speckle, Applied Optics, vol. 28, No. 24, Dec. 15, 1989.

* cited by examiner

Primary Examiner—Timothy J Thompson
(74) Attorney, Agent, or Firm—Kenneth J. Lukacher

(57) ABSTRACT

Optical elements for efficiently diffusing or shaping light have substrates with saddle shaped structures on their surfaces which provide substantially uniform light along a predefined angular range. Each saddle shaped structure defines an aperture of a lens, where the outer boundary of such aperture, when viewed normal to surface, may be of one of more different shapes, such as square or rectangular, circular, hexagonal, oval, or other geometric or arbitrary shape which may represent a full saddle shape or a subset region thereof. A plurality of saddle shaped structures may be arranged periodically or randomly along the surface. An optical element with a saddle shaped structure is referred to as a saddle lens, and optical elements with different shaped saddle shaped structures provide different types of saddle lenses.

28 Claims, 27 Drawing Sheets

OPTICAL ELEMENTS WITH SADDLE SHAPED STRUCTURES FOR DIFFUSING OR SHAPING LIGHT

FIELD OF THE INVENTION

The present invention relates to optical elements for diffusing or shaping light, and relates particularly optical elements for efficiently diffuses or shapes light having substrates with saddle shaped structures on their surfaces. The optical elements provide optical devices which efficiently provide substantially uniform light along a predefined angular range. Such optical devices are useful in optical applications, such as light diffusion and homogenization, beam shaping, displays, and illumination systems.

BACKGROUND OF THE INVENTION

Optical devices that affect and modify the propagation of luminous energy, such as lasers and light-emitting diodes (LED), with the purpose of homogenizing or redistributing its energy content at a location farther away from the device are generally referred to as diffusers or beam shapers. Such devices are broadly characterized by a surface pattern that contains height variations that alter the direction of propagation of the incoming illumination in typically random directions within a certain range which depends on the features of said surface pattern. A common example of diffuser commercially available is ground glass, produced by the roughening of one of its surfaces. Because of the uniformly random distribution of height variations on its rough surface, ground glass spreads the incident illumination with a Gaussian dependence against scatter angle. Holographic diffusers, formed by exposure of laser speckle, also exhibit Gaussian scatter. For example, a description of holographic diffusers can be found in K. D. Bonin and M. A. Kadar-Kallen, "Simple diffuser for production of laser speckle," Applied Optics 28, 5293-5297 (1989). Ground glass and holographic diffusers can be thought of as belonging to the same family of devices characterized by a surface with a uniformly large distribution of random height variations. Diffusers of this type generally lead to Gaussian scatter.

Gaussian diffusers find the most use in the homogenization of light. For instance, LED sources typically produce strongly uneven illumination. A Gaussian diffuser can be used to make the LED light more homogeneous. However, homogeneity does not necessarily imply a high degree of uniformity or efficiency. A Gaussian profile can only provide high uniformity of light distribution with very low efficiency and, conversely, high efficiency with very non-uniform light distribution. Uniform light in the present context means light distribution with small variation of the measured intensity and efficiency means the fraction of the incident illumination that is concentrated over a specified angular range or region of space.

Another class of diffusers, diffractive diffusers, are based on the principles of interference and diffraction and can be designed to produce fairly general scatter patterns. A simple discussion of diffractive diffusers can be found in D. R. Brown, Beam shaping with diffractive diffusers in Laser Beam Shaping, F. M. Dickey and S. C. Holswade, eds., Marcel Dekker, New York, 2005, pp. 249-271, Chap. 6. Depending on the design approach and the symmetry properties of the pattern to be produced high efficiency is possible, 80-90%, and in some cases even higher. However, because diffractive elements achieve light spread through feature sizes, they are limited to relatively small diffuser angles. As the desired angular spread increases the required feature size for the diffractive element decreases and it becomes more difficult to produce the element. In addition to this practical difficulty, diffractive elements are generally limited to single wavelength operation, and if the spectrum of the incident illumination includes several spectral lines the zero order of the diffraction pattern produced by the diffractive diffuser increases beyond the maximum value of all the other diffraction orders, sometimes several times the maximum of the other diffraction orders, as a result negatively effects light diffusing performance. This phenomenon is generally referred to as the "zero-order problem." Although in some cases it is possible to design a diffractive element that operates over a broad continuous spectral band, such as disclosed in U.S. Pat. No. 6,118,559, fabrication difficulties persist as well as the need for coherent illumination. As a result, diffractive diffusers are typically limited to specialized applications diffusing monolight coherent illumination.

There is thus a necessity for a diffuser that can be employed in general applications and enable uniform scatter patterns for monochromatic or broadband illumination with high efficiency. There are several examples of diffuser components that attempt to address this issue. The mixing rod provides a simple example where light is coupled in one end of the rod and comes out of the opposite end, after propagating through the rod by means of total internal reflection. Unfortunately, mixing rods can only provide good uniformity for specific patterns, specifically, simple patterns that completely fill the plane. For example, mixing rods can produce square and hexagonal patterns with good uniformity but cannot generate a uniform round pattern. Furthermore, mixing rods are in a sense volume diffusers that require a minimum volume extent to ensure a certain degree of uniformity. As a result, these are not very compact devices. Also, periodic microlens arrays have also been used to some degree as diffusers. Either single microlens arrays or fly's eye arrangements have been reported for producing uniform scatter patterns with high efficiency (see, for example, "Wave optical analysis of light-emitting diode beam shaping using microlens arrays," Opt. Eng. 41 (2002) 2393-2401). However, similar to mixing rods, the periodic nature of the array implies that it can only be used to produce patterns that can perfectly cover the plane such as square, rectangular, or hexagonal. A periodic microlens array cannot, for instance, produce a uniform circular pattern. Furthermore, since a periodic microlens array is a grating, it gives rise to diffraction artifacts that can be objectionable in some applications and may require the use another weak diffuser to work in connection with the microlens arrays with the purpose of randomizing the observed diffraction pattern.

Another approach, such as that described in "Photofabrication of random achromatic optical diffusers for uniform illumination", Appl. Opt. 40, 1098-1108 (2001), describes a diffuser where the surface pattern is formed by piecewise linear segments. Although effective in principle, such approach does not seem practical as it requires large illumination areas to produce a surface that covers the continuum of slopes required for uniform illumination. Random microlens arrays, such as discussed in U.S. Pat. Nos. 7,033,736 and 6,859,326, can address these issues and be used for general beam shaping, including producing uniform scatter patterns. The design process, however, can be complex since it requires a random distribution of microlens units with specified probability density functions that need to be optimized to achieve the desired scatter properties.

Together with high uniformity, it is generally desirable that the diffuser device exhibit high efficiency. That is, most of the light should be directed towards the desired target angular range or region where high uniformity is needed. There are three basic regions associated with a general scatter pattern. FIG. 1 illustrates these concepts using the cross-section of a scatter pattern from a random microlens diffuser. The target angular region represents the domain over which high efficiency and uniformity is required. In the example of FIG. 1 the target region is in the angular range of ±7.2 degrees. The fall-off region represents the transitional domain where the intensity falls from the levels at the target region down to zero. Since the intensity rarely falls to zero it is common to utilize a definition such as the extent of the region where the intensity falls from 90% to 10% of the average value within the target region. In the case of surface diffusers the character of the fall-off region is determined by the point spread function of the elementary scatter elements that compose the diffuser. The domain beyond the fall-off region is the region of scatter loss or high diffraction orders and generally contains light lost due to fabrication imperfections, roughness, or high diffraction orders in the case of diffractive elements. The amount of energy in this last region can be in principle minimized in the case of refractive elements, such as microlens-based diffusers, by fabrication improvements. In the case of diffractive elements this is not necessarily true since high-order energy loss is often a natural consequence of the design process itself.

As mentioned previously, Gaussian diffusers such as ground glass and holographic can be problematic when there is a need for both high uniformity and efficiency. Diffractive diffusers produce diffraction orders that generally contain 80-90% of the incoming light within the target region lost to higher orders. The remainder falls outside of the target region. The point spread function may be determined in the particular case of binary diffractive diffusers where the surface is composed of only two constant height levels. As is well-known from the theory of diffraction (see, for instance, J. W. Goodman, Introduction to Fourier Optics, McGraw-Hill, New York, 1996) an aperture that imparts a constant phase delay produces the so-called diffraction-limited spot in the far-field or at the focus of a lens. In the case of a round aperture this is called an Airy disk pattern. The diffraction-limited point spread function is narrowest for a square or simple slit where the angular width of the diffraction pattern is $\pm \lambda/D$, where $\lambda$ is the wavelength of the incident illumination and D is the beam size. At the edge of the scatter pattern, the intensity fall-off corresponds to the intensity fall-off of the point spread function of the elementary scatter elements. Therefore, given that the diffraction-limited point spread function is very sharp, for a diffractive element the major source of efficiency loss is due to higher-order light directed outside of the target.

A microlens-based diffuser, on the other hand, does not intrinsically scatter light outside of the target region. In practice, fabrication limitations lead to wide-angle scatter outside of the target region but this source of loss may be minimized by improving manufacturing techniques. However, the point spread function of a microlens unit is considerably wider than the diffraction limit and, as a result, the efficiency of a microlens diffuser is mostly limited by the energy in the fall-off region. The case of a microlens diffuser is thus opposite to that of a diffractive diffuser with the absence of intrinsic loss to higher diffraction orders but wider intensity fall-off because of the point spread function of the elementary lens unit.

Thus, it would be desirable to provide light diffusing optical devices that enable substantially uniform scatter patterns for monochromatic or broadband illumination along a target angular range or region that is efficient in minimizing light falling outside of the target angular range, and moreover is useful for diffusing both coherent and non-coherent illumination, and do rely on use of gratings associated with diffractive diffusers.

SUMMARY OF THE INVENTION

Accordingly, it is an object of the present invention to provide improved optical elements for efficient diffusing light which are applicable to a wide variety of optical applications, which do not have the drawbacks of prior art diffusers.

Another object of the present invention is to provide improved optical elements for efficiently providing substantially uniform along an target angular range or region, whereby such efficiency is characterized by the improved sharp fall off of light in a transitional region along periphery of such angular range, and the substantial absence of light falling at angles beyond the transitional region, where such efficiency does not rely on the use of gratings associated with diffractive diffusers.

A further object of the present invention is to provide improved optical elements for diffusing light along a target angular range or region useful for monochrome (single wavelength), broadband, or other ranges of light of different wavelengths.

Briefly described, the invention embodies an optical element for diffusing or shaping light having a substrate with a saddle shaped structure on its surface. Such saddle shaped structure provides substantially uniform distribution of light along a predefined angular range when light is received by the optical element incident another surface of the substrate.

The saddle shaped structure defines an aperture of a lens, where the outer boundary of such aperture, when viewed normal to surface, may be of one of more different shapes and sizes, such as square or rectangular, circular, hexagonal, oval, or other geometric or arbitrary shape which may represent a full saddle shape or a subset region of such full saddle shape. In other words, the aperture boundary shape may be the full aperture of the saddle shaped structure, which is square or rectangular, or a centered or off-centered subset (or subregion) of the full aperture of the structure of a geometric or arbitrary shape. The saddle shaped structure has a curvature (or profile), which utilizes refraction to obtain the desired optical performance (e.g., uniformity and efficiency) to diffuse and/or shape light received by the optical element along the predefined angular range for the particular optical application in which the optical element is used. Thus, the term saddle shaped structure covers all cases of saddle shape structures where square, rectangular or any subset region thereof which is sufficient to provide the desired optical performance.

As the optical element does not rely on a grating to diffuse light to obtain the desired optical performance, the optical element is not wavelength limited, but may be used for monochrome, broadband light, and other ranges of light of different wavelengths, and not limited to coherent or non-coherent light. Less preferably, a grating equivalent to the function of the curvature or sag of a saddle shaped structure may be provided along the substrate surface, and useful in applications employing monochromatic coherent light.

Multiple or aggregates of saddle shaped structures may be provided on the substrate of the optical element and arranged periodically (e.g., array) or randomly along the surface of the substrate, with or without periodic or random rotation in the case of non-circular saddle shaped structures. Preferably, where saddle shaped structures are randomly arranged, in additional to random spatial placement along the substrate, two or more of the saddle shaped structures may be of a different distinct designs. Also, combinations of saddle shaped structures of different shapes may be provided along a common substrate.

The term substrate defines any body of optical material, such as glass, plastic, or film layer, which is sufficient in thickness onto which saddle shapes structure(s) or subset(s) thereof, may be formed to provide the desired diffusion, redistribution, or shaping of light. Preferably the saddle shaped structure(s) are provided along the substrate as a relief pattern.

An optical element having a saddle shaped structures may be referred to herein as a saddle lens, and optical elements with saddle shaped structure of a different shaped aperture boundaries provide different types (or classes) of saddle lenses. For ease of explanation, a saddle lens with a circular boundary may be referred to as a circular saddle lens, and a saddle lens with a square boundary may be referred to as a square saddle lens, and so forth.

DETAILED DESCRIPTION OF THE DRAWINGS

The foregoing objects, features and advantages of the invention will become more apparent from a reading of the following description in connection with the accompanying drawings, in which:

FIG. 1 is a graph of intensity versus angular distribution along a cross-section (one-dimension) of a scattering pattern (called herein an intensity profile) for a prior art example of one microlens of a random microlens diffuser to illustrate its performance at different angles to illustrate light along a target angular region, fall-off (transitional) region, and beyond the transitional region as the angle increases;

Figure 8:
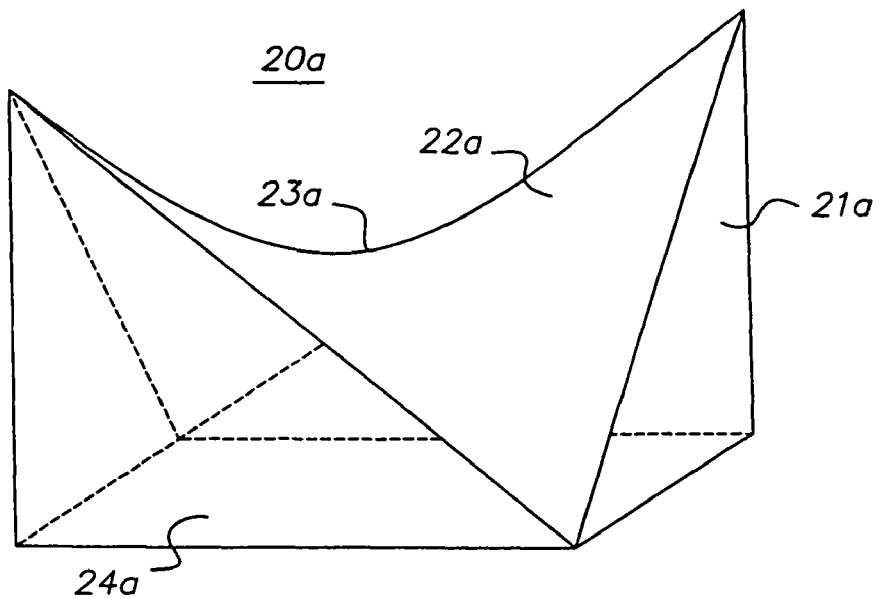
FIG. 8 is a perspective view of an example of one type of optical element of the present invention, called herein a saddle lens, showing a single saddle shaped structure along a surface of a substrate having a square or rectangular aperture to provide a square saddle lens.
Figure 9:
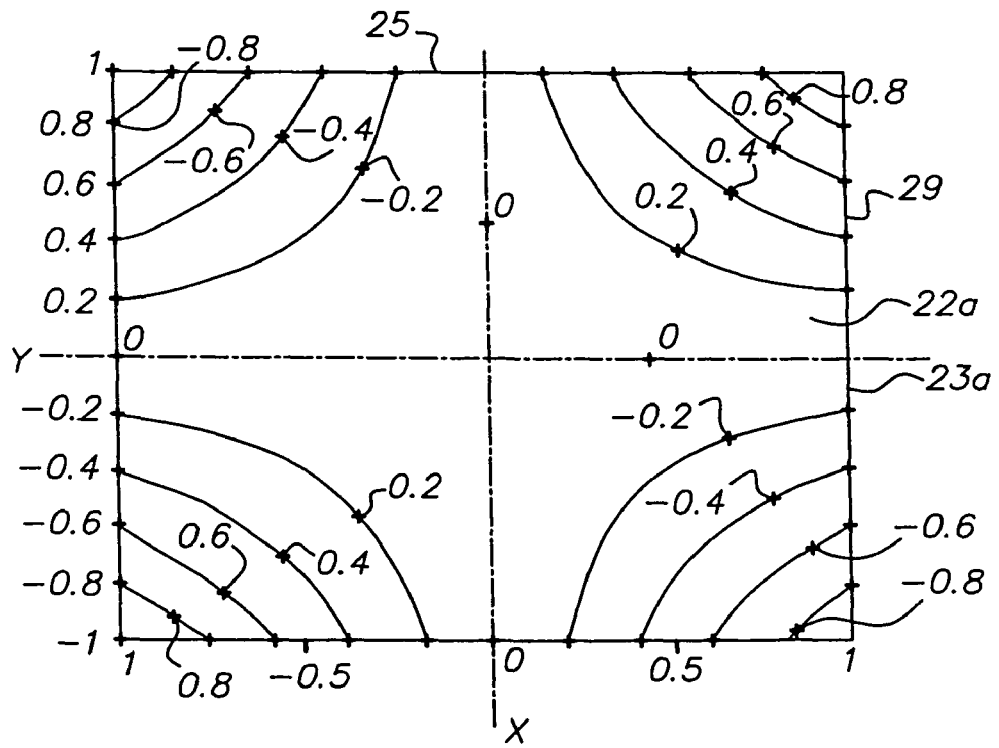
FIG. 9 is a contour plot for the saddle lens of FIG. 8 on normalized coordinates taken from a top view thereof illustrating a square or rectangular aperture.
Figure 10:
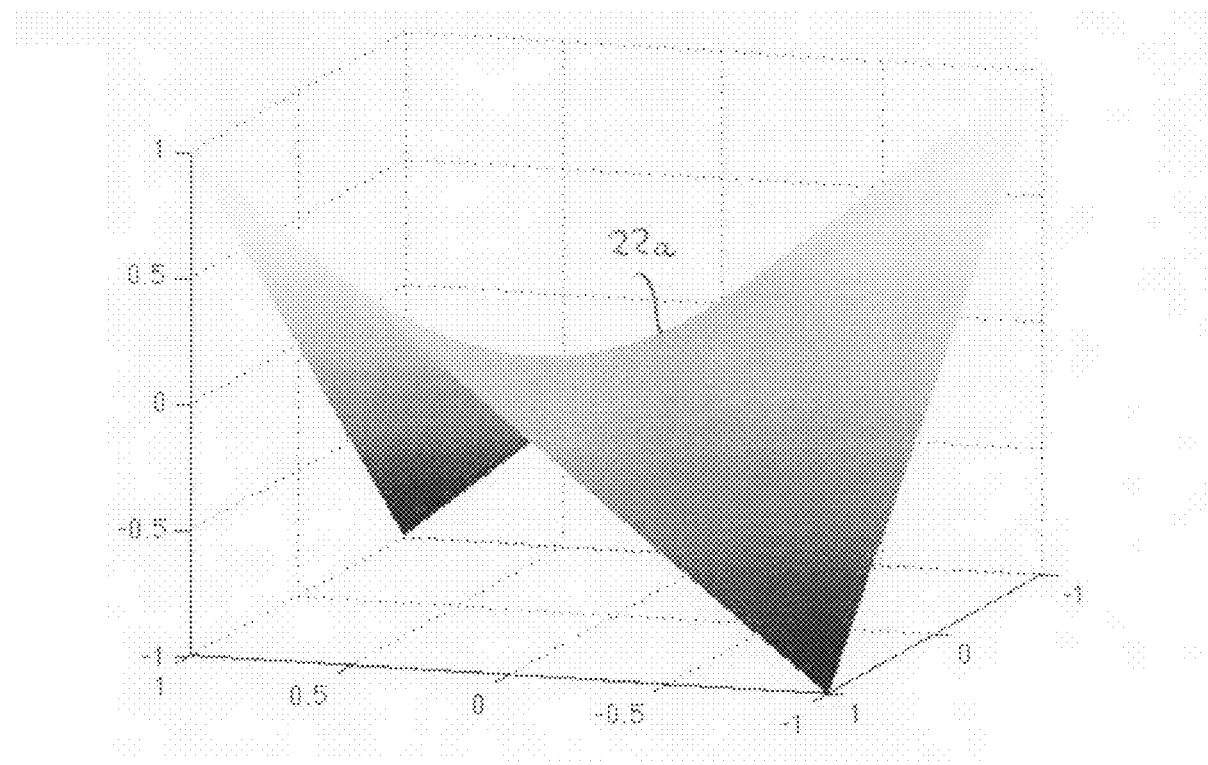
FIG. 10 shows the three-dimensional view of the saddle shaped structure of the saddle lens of FIG. 8 on normalized coordinates in which shading is associated with depth to show curvature of the structure.
Figure 18:
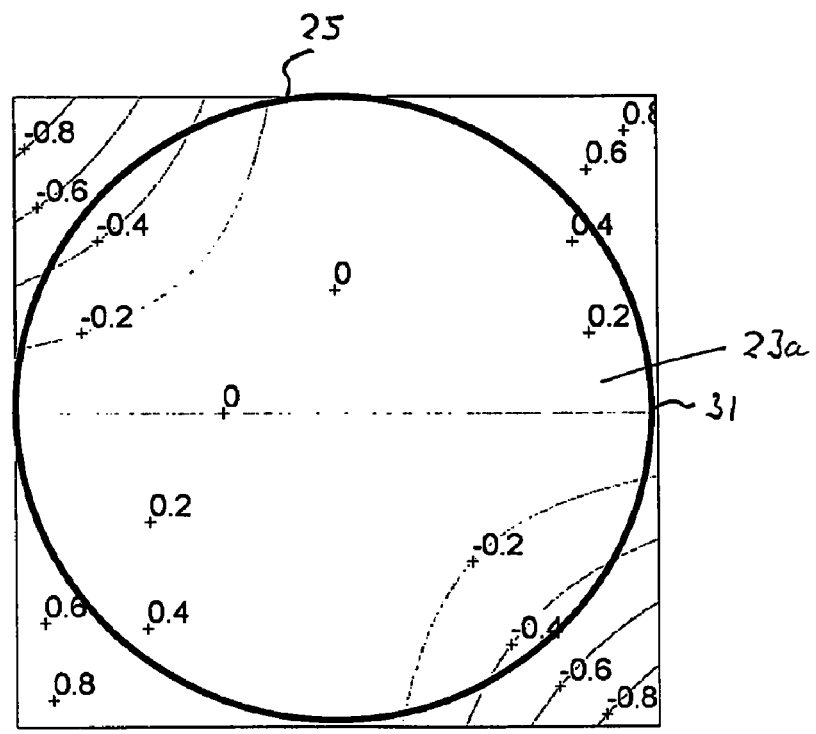
FIG. 18 is another contour plot for the saddle lens of FIG. 9 of the saddle shape structure of FIG. 8 showing an outline where the saddle structure may be a circular subset region of the square or rectangular len's aperture to provide another type of saddle lens of the present invention.
Figure 19:
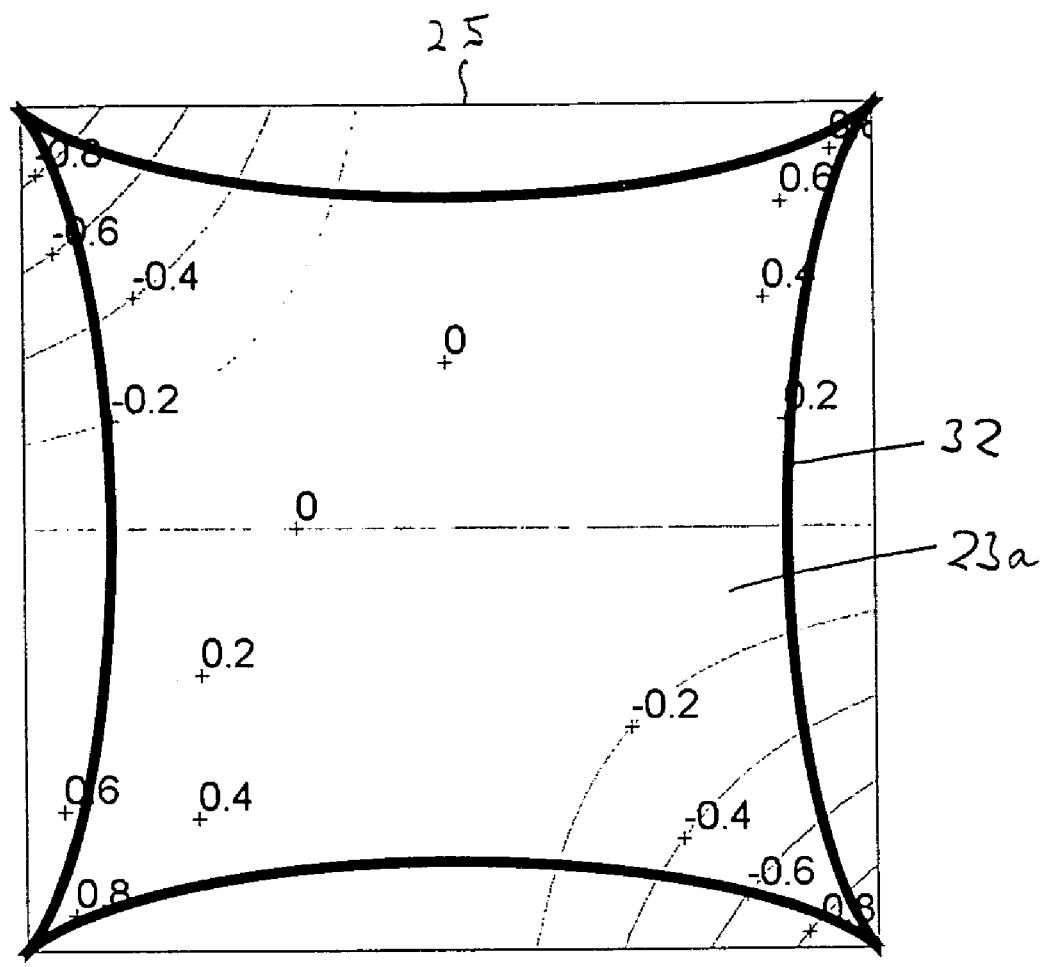
Figure 20A:
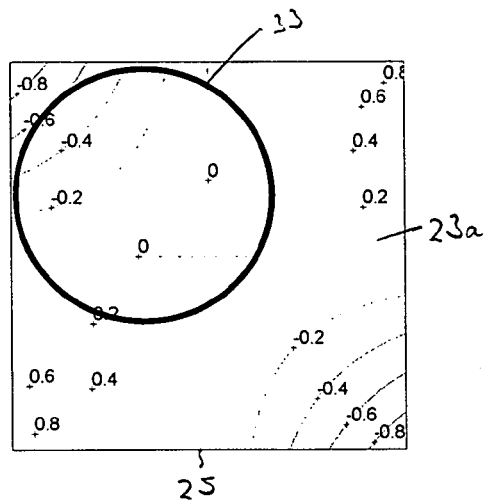
Figure 20B:
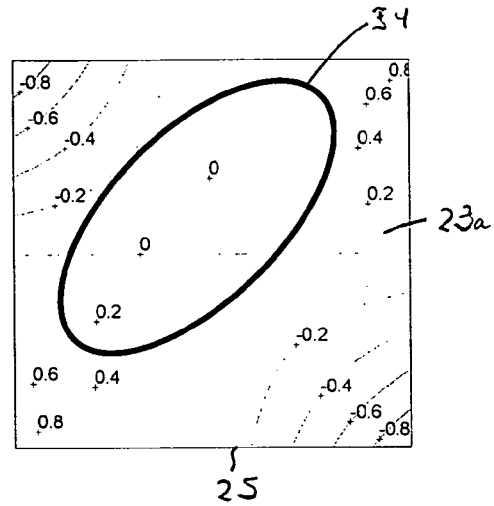
Figure 20C:
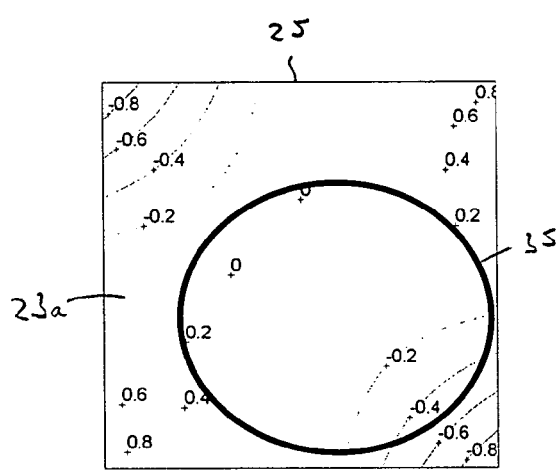
Figure 20D:
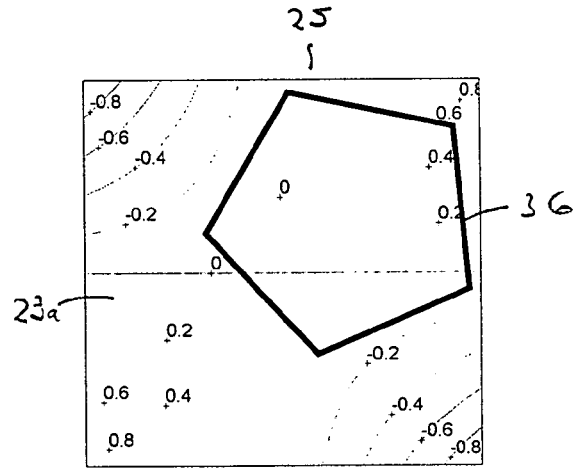
Figure 21A:
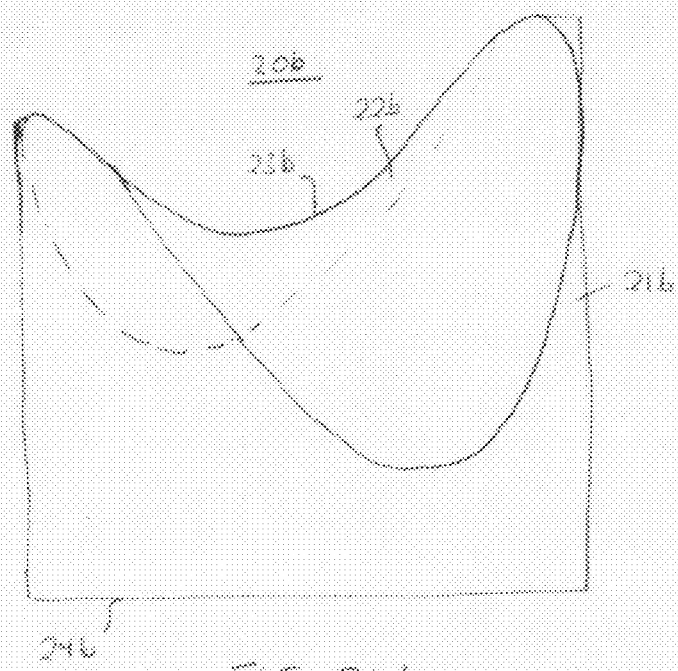
Figure 21B:
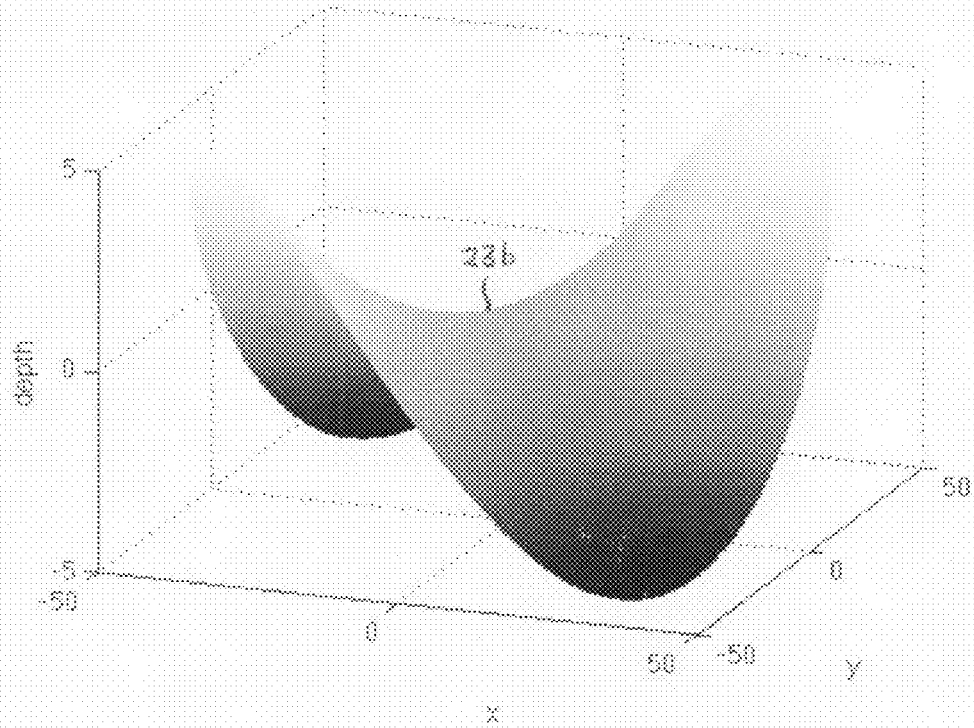
Figure 22:
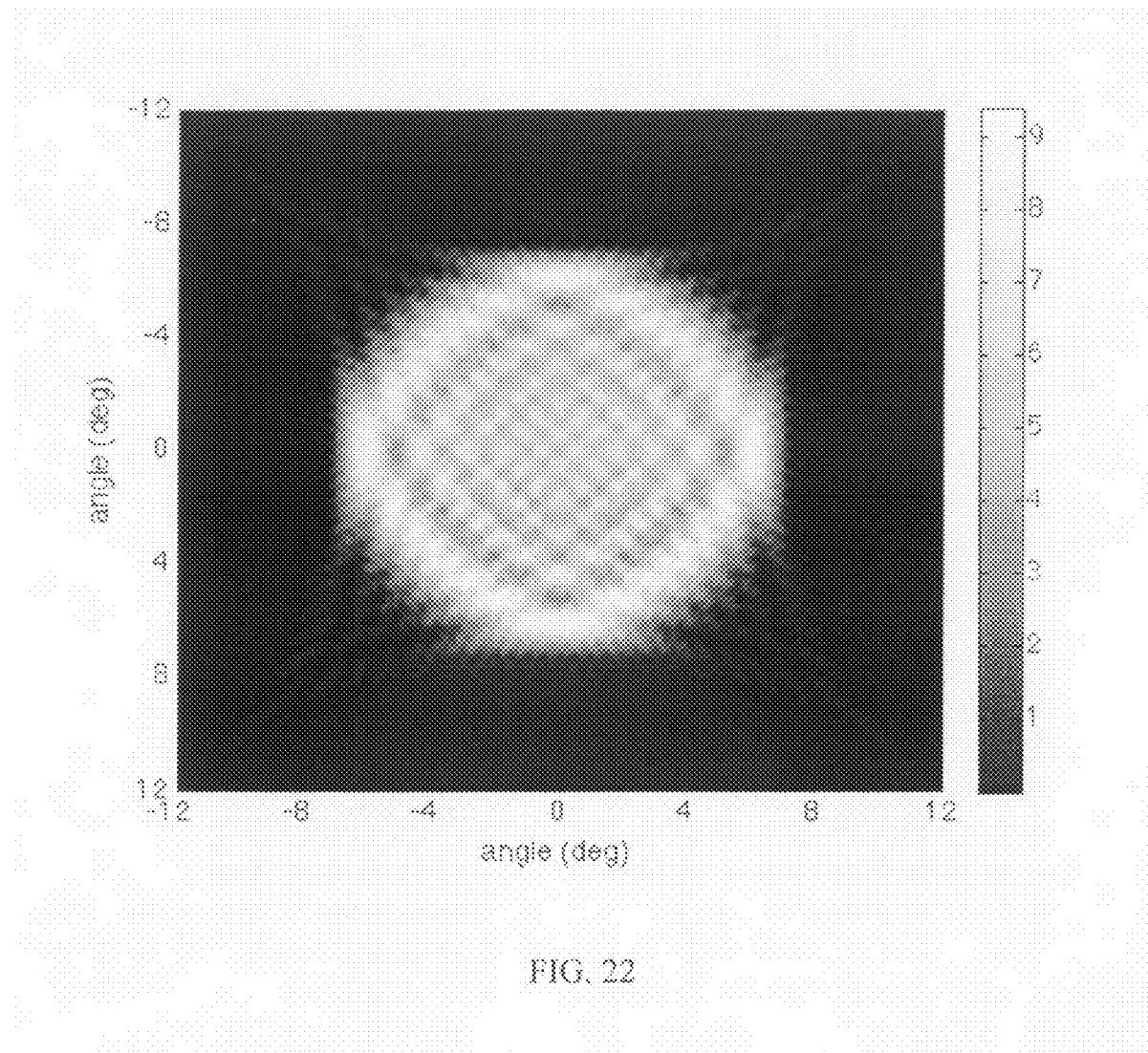
Figure 23:
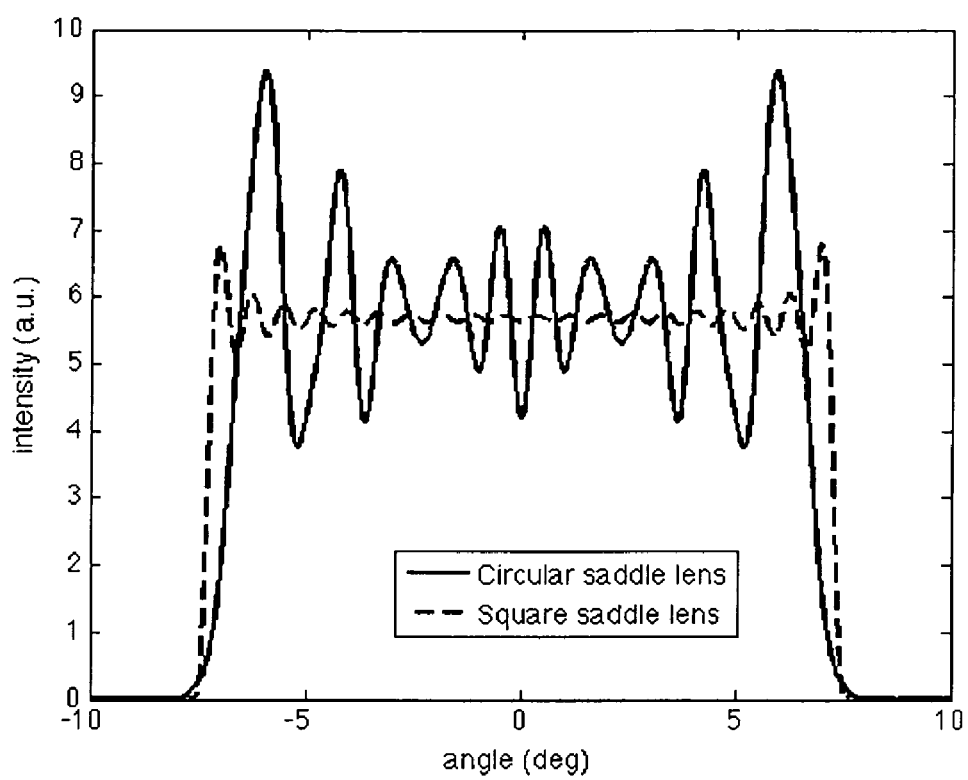
Figure 24:
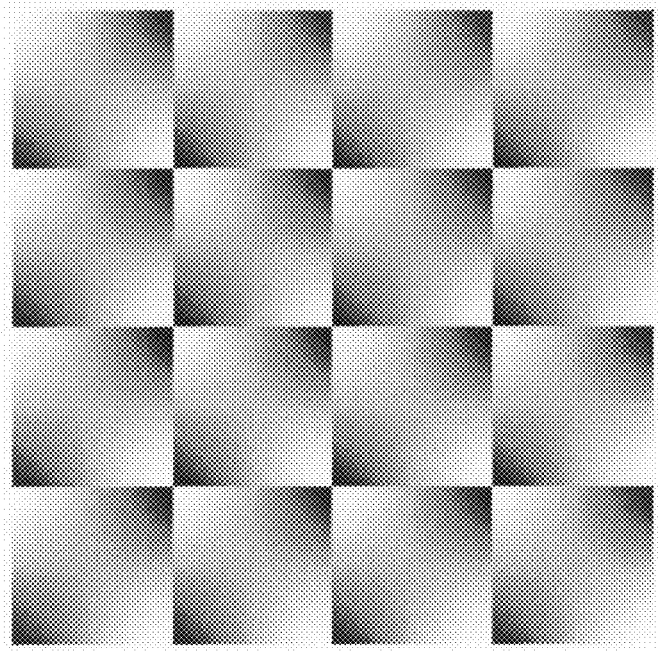
Figure 25:
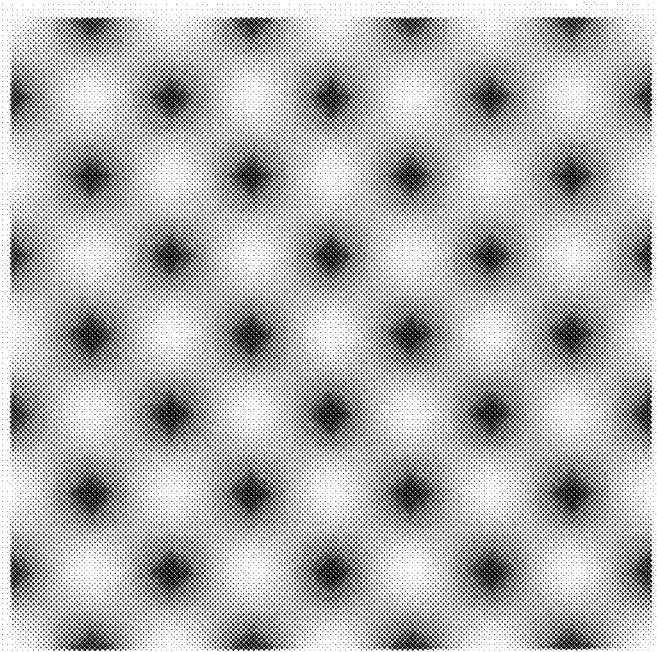
Figure 26:
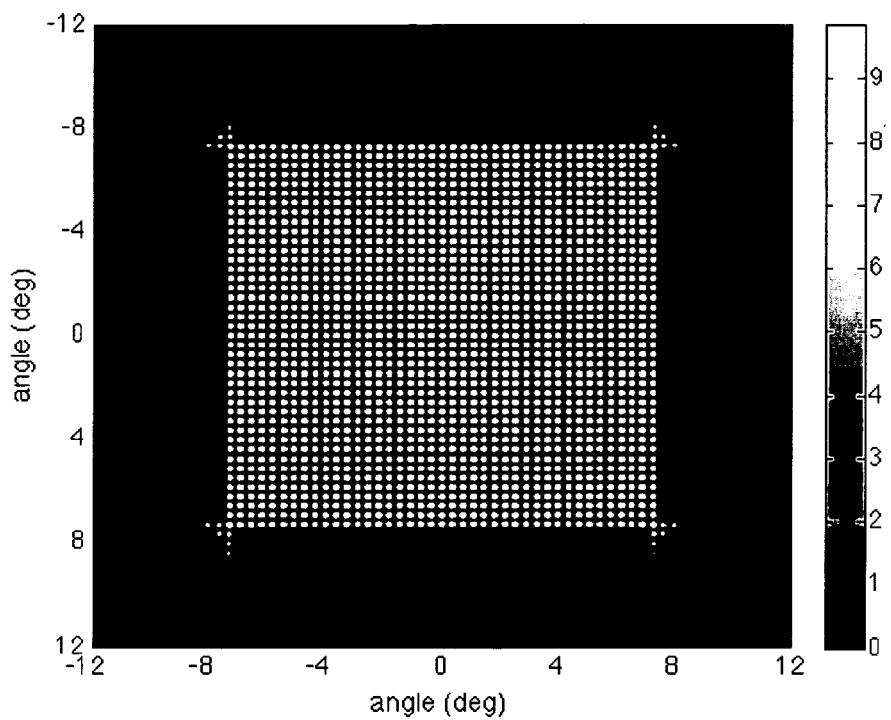
Figure 27:
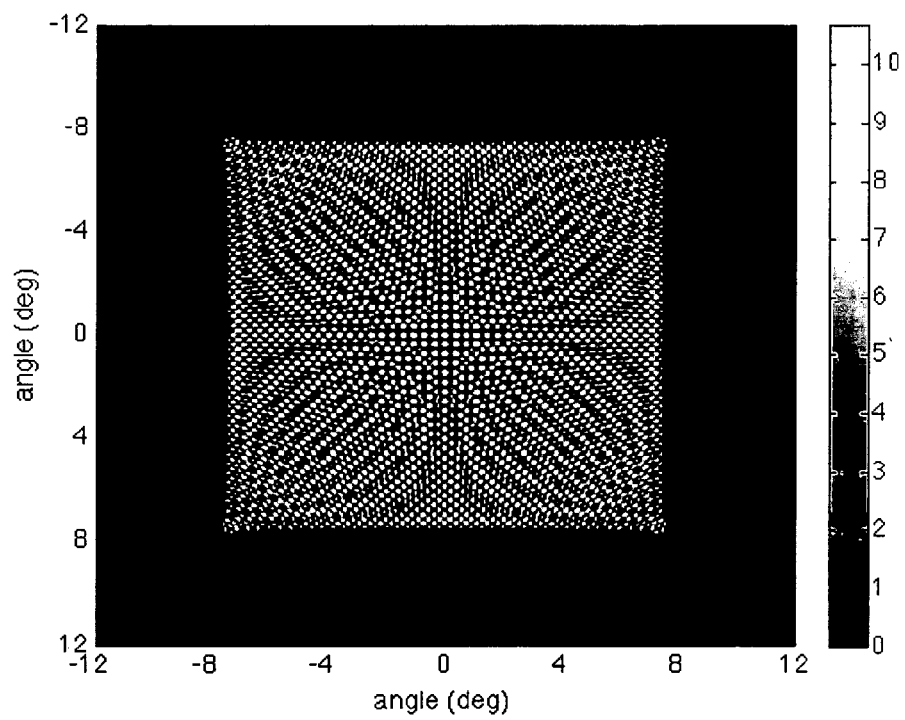
Figure 28:
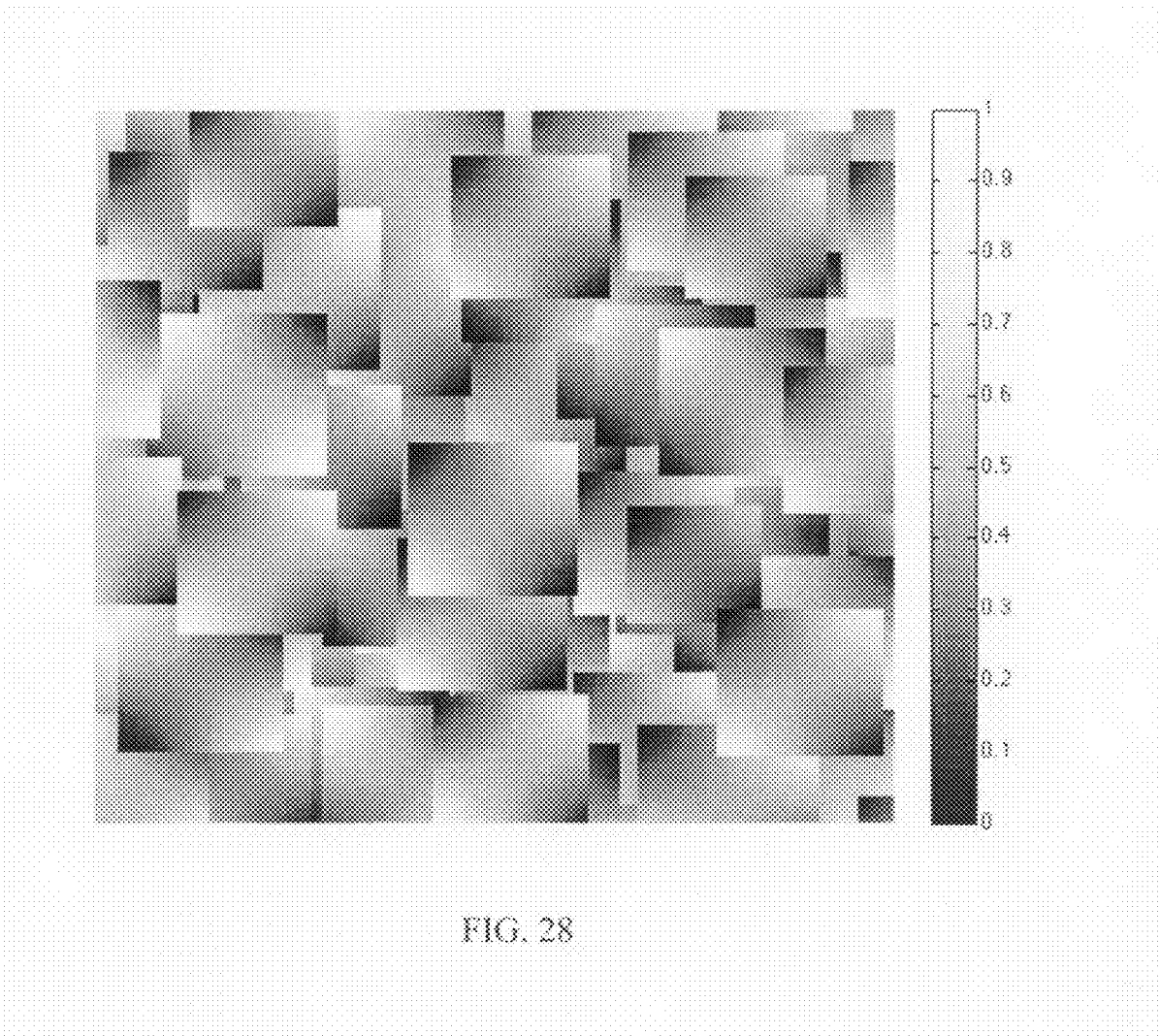
Figure 29:
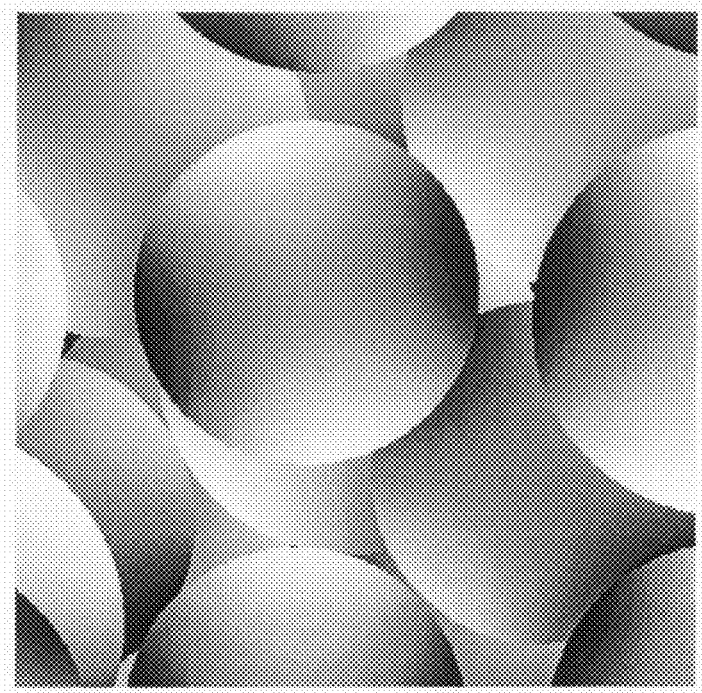
Figure 30A:
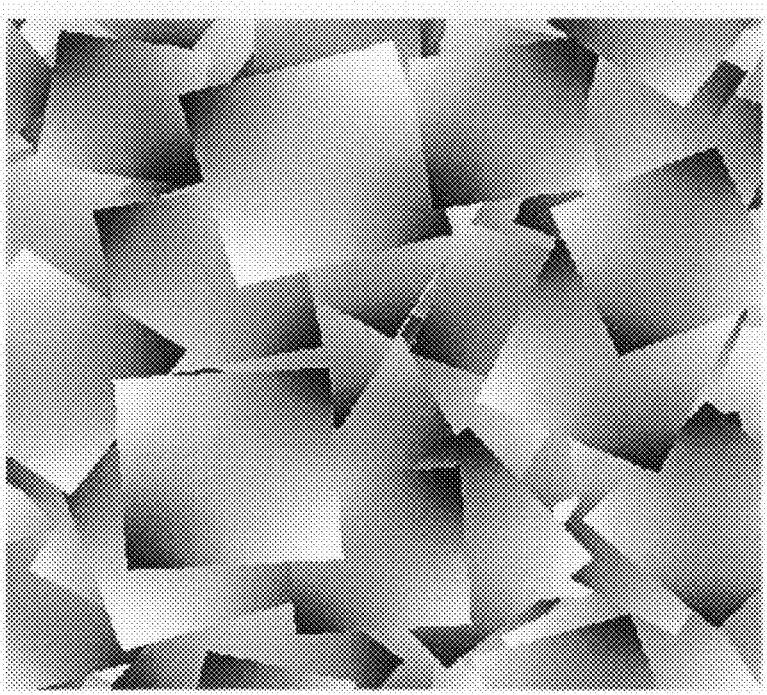
Figure 30B:
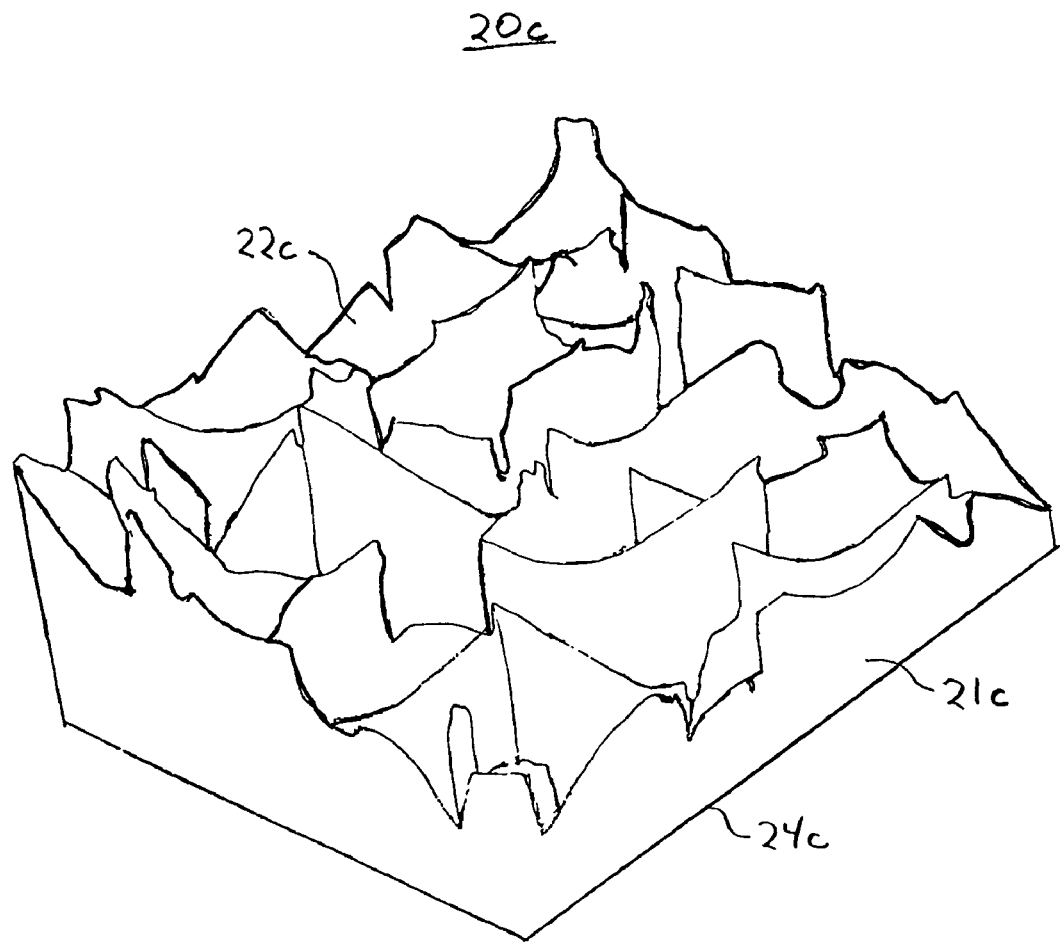
Figure 30C:
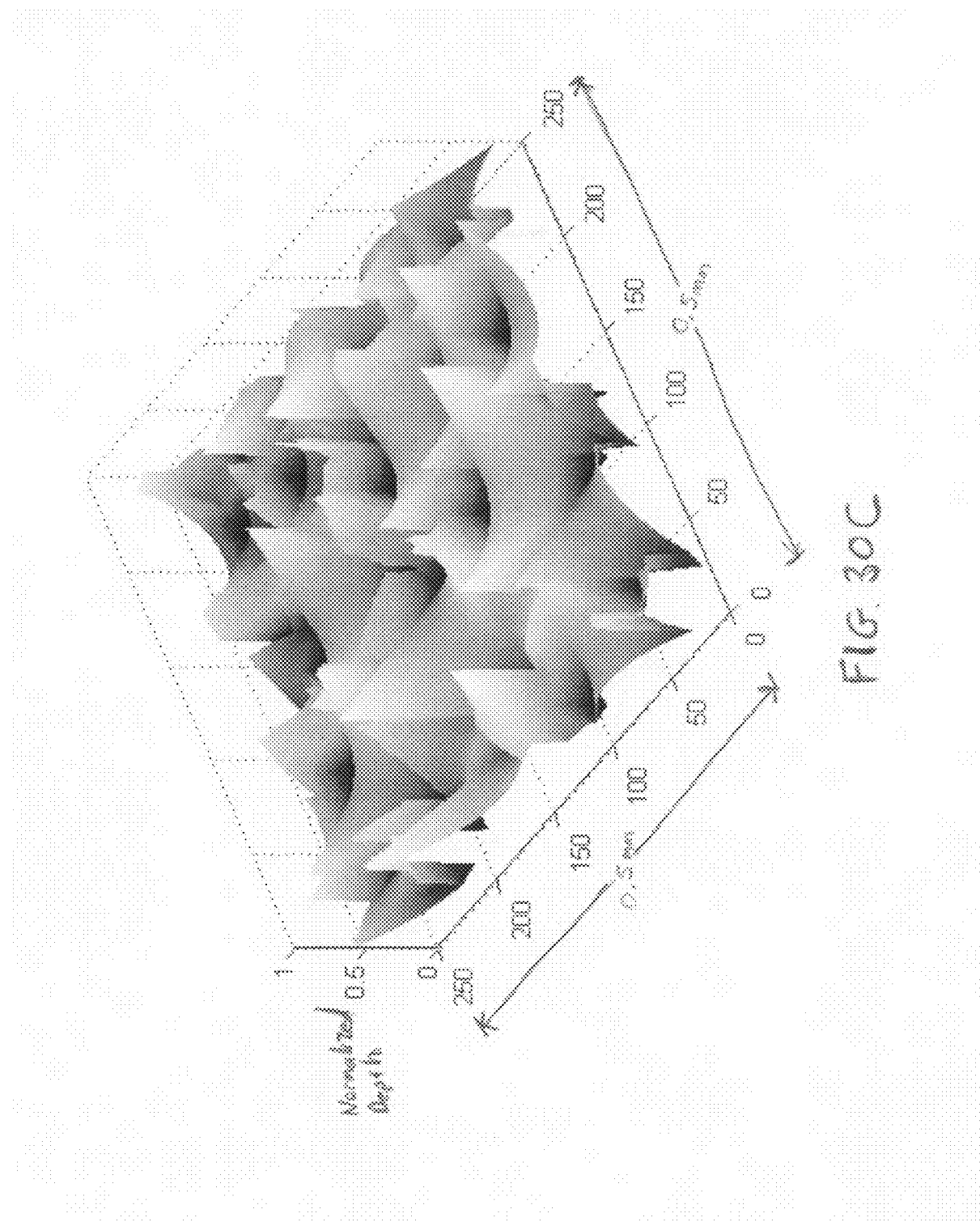
Figure 31A:
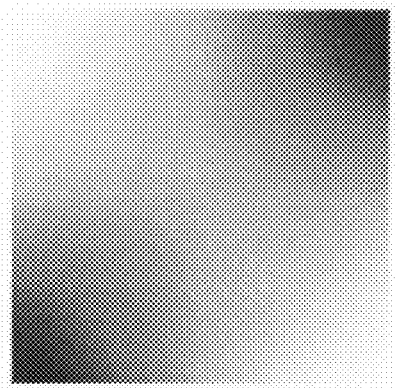
Figure 31B:
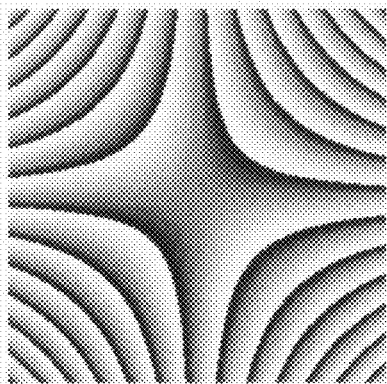
Figure 31C:
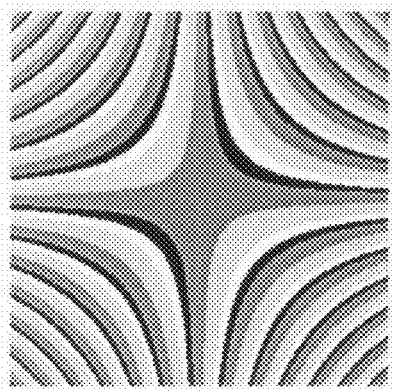
Figure 31D:
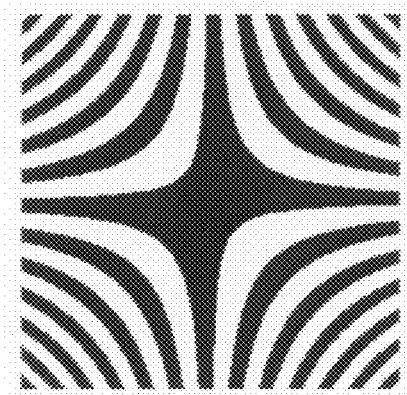

FIG. 19 is another contour plot for the saddle lens of FIG. 9 of the saddle shape structure of FIG. 8 showing an outline where the saddle structure may be a general subset region of the square or rectangular len's aperture to provide another type of saddle lens of the present invention to illustrate that regions of general or arbitrary shape of the len's aperture provide different types of saddle lenses;

FIGS. 20A, 20B, 20C, and 20D are contour plots for the saddle lens of FIG. 9 of the saddle shape structure of FIG. 8 showing an outline where the saddle shaped structure may be a off-centered subset regions of different shapes (circular—FIG. 20A; oval—FIGS. 20B, 20C; and hexagonal—FIG. 20D) of the square or rectangular len's aperture to provide still further types of saddle lens of the present invention;

FIG. 21A is a perspective view of an example of an optical element providing a saddle lens with a circular boundary in accordance with the contour map of FIG. 18, called herein a circular saddle lens;

FIG. 21B is a view similar to FIG. 10 showing a three-dimensional view of the circular saddle lens of FIG. 21A;

FIG. 22 is a plot of the light output distribution (e.g., scatter pattern) just above the surface for the single circular saddle lens of FIGS. 21A and 21B when illuminated from the surface opposite the structured surface;

FIG. 23 is a graph of an intensity profile of the circular saddle lens of FIGS. 21A and 21B and of the square saddle lens of FIG. 8 (a more detailed view of FIG. 12) to compare their performance;

FIG. 24 is a top view of another type of optical element of the present invention illustrating depth of curvature or sag for an example of a periodic arrangement of saddle shape structure (or lens) of FIGS. 8 and 9 along the surface of a substrate in which the arrangement of square saddle lens provides a discontinuous surface along the substrate;

FIG. 25 is a top view of another type of optical element of the present invention illustrating depth of curvature or sag for another example of the periodic arrangement of saddle shape structures of FIGS. 8 and 9 in which every other square saddle lens is flipped to provide a continuous surface along the substrate;

FIGS. 26 and 27 are plots of the light output distribution (e.g., scatter pattern) just above the surface for the periodic arrangement of saddle lenses of FIGS. 24 and 25, respectively, when illuminated from the surface opposite the structured surface;

FIG. 28 is a top view of another type of optical element of the present invention illustrating depth of curvature or sag for an example of a non-periodic or random distribution of saddle shape structures of FIGS. 8 and 9 in which spatial placement and design parameters of such square saddle lenses randomly varies;

FIG. 29 is a top view of another type of optical element of the present invention illustrating depth of curvature or sag for an example of a non-periodic or random distribution of saddle shape structures of FIGS. 21A and 21B in which spatial placement and design parameters of such circular saddle lenses randomly varies;

FIG. 30A is a top view of another type of optical element of the present invention illustrating depth of curvature or sag for an example of a non-periodic or random distribution of saddle shape structures of FIGS. 8 and 9 in which spatial placement, rotation, and design parameters of such square saddle lenses randomly varies;

FIG. 30B is a perspective view of the optical element of FIG. 30A;

FIG. 30C is a three-dimensional view of the multiple saddle structures of the optical element of FIGS. 30A and 30B on normalized coordinates in which shading is associated with depth to show curvature of such structures;

FIG. 31A is a top view of the square saddle lens of FIG. 8 illustrating depth of curvature or sag; and FIGS. 31B, 31C, and 31D are top views illustrating depth of curvature or sag of various diffractive realizations of the function providing the square saddle lens of FIG. 8.

DETAILED DESCRIPTION OF THE INVENTION

The optical elements of the present invention for diffusing or shaping light have substrates with one or more saddle shaped structures, or subsets thereof, on their surface to provide substantially uniform distribution of light along a predefined angular range when light is received by the optical elements incident another surface of their substrates. An optical element with a saddle shaped structure, as stated earlier, is called a saddle lens. Prior to showing examples of such saddle lenses in connection with FIGS. 8-23, or combinations of arrangements of saddle lenses, of FIGS. 24-30. A discussion of the design of the saddle shaped structures will now be provided after an overview of prior art optical designs typically used to achieve light control.

Figure 1:
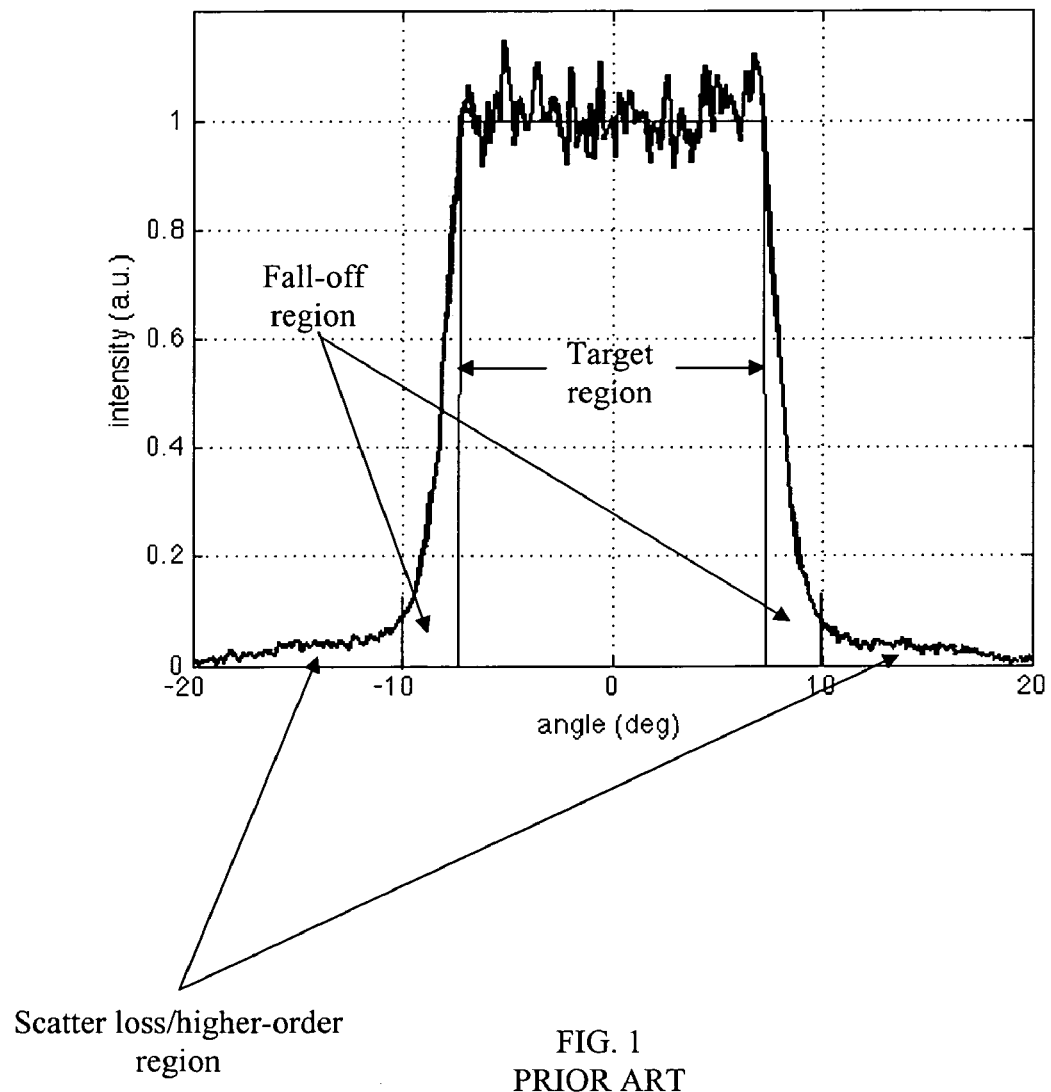
Figure 2:
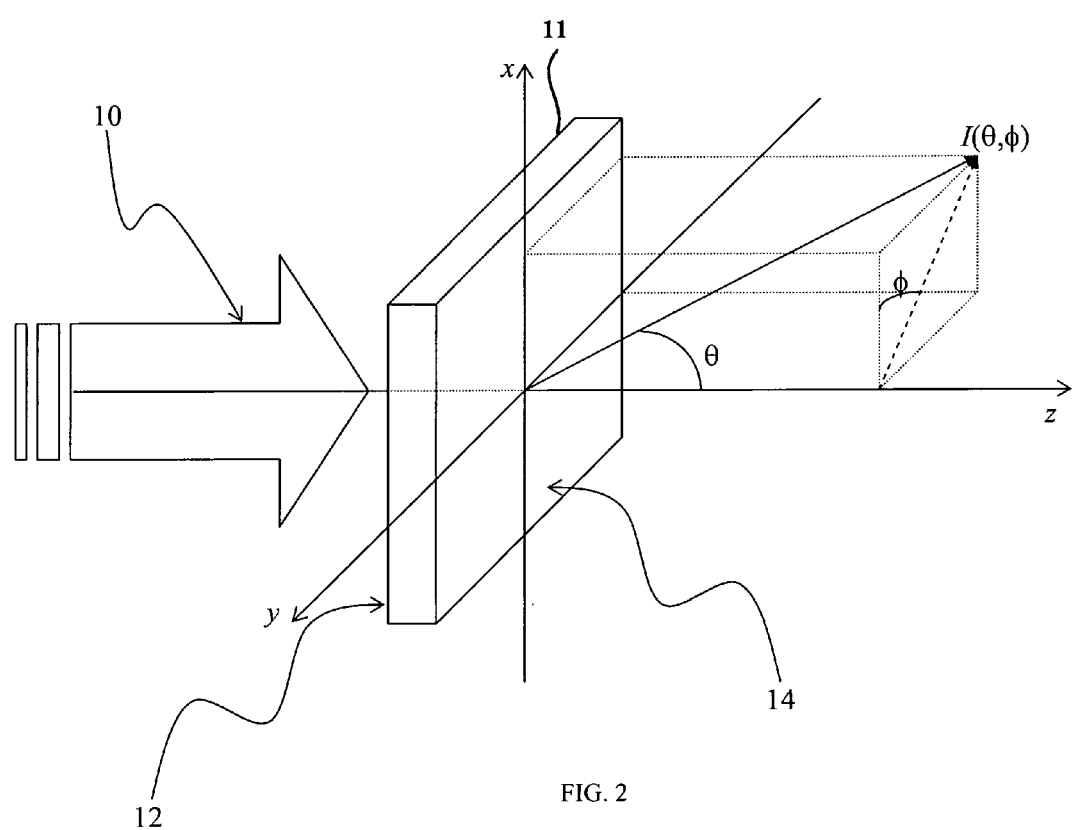
FIG. 2 is an optical diagram to show the geometry for an optical element under illumination.

The definitions of the optical design discussion is shown in FIG. 2. The incident illumination 10 is assumed to be substantially collimated and passes through a diffuser device 11 incident a patterned surface 12 first. After traversing the opposite surface 14 the illumination propagates away from the device 11. The radiation scattered away from the device 11 is then be characterized by the intensity $I(\theta,\phi)$ measured at the angle coordinates $(\theta,\phi)$. The incident illumination can be characterized by a wavelength, a set of wavelengths, or a continuum of wavelengths.

The efficiency $\eta$ over a certain angular region A is defined as follows $$\eta = \frac{\int\int_A I(\theta, \phi) d\theta d\phi}{\int_0^{90}\int_0^{360} I(\theta, \phi) d\theta d\phi}, \quad (1)$$

where the angle $\theta$ goes from 0 to 90 degrees and $\phi$ spans the full 0 to 360-degree range.

The uniformity within the angular range A is very simply defined as follows $$\sigma = \frac{\min\{I(\theta,\phi)\}_A}{\max\{I(\theta,\phi)\}_A}, \quad (2)$$

by taking ratio of the minimum value of intensity to the maximum, within the angular range A. To cover the case of laser illumination where the presence of speckle will induce strong intensity fluctuations, the intensity can be first sampled over a coarser angle range that allows the averaging of several speckle patterns before applying the definition expressed by Eq. (2). Note that if the extreme values of intensity are equal, then uniformity is maximum and has value 1. Deviations from the uniformity condition lead to values of $\sigma$ less than 1.

Figure 3:
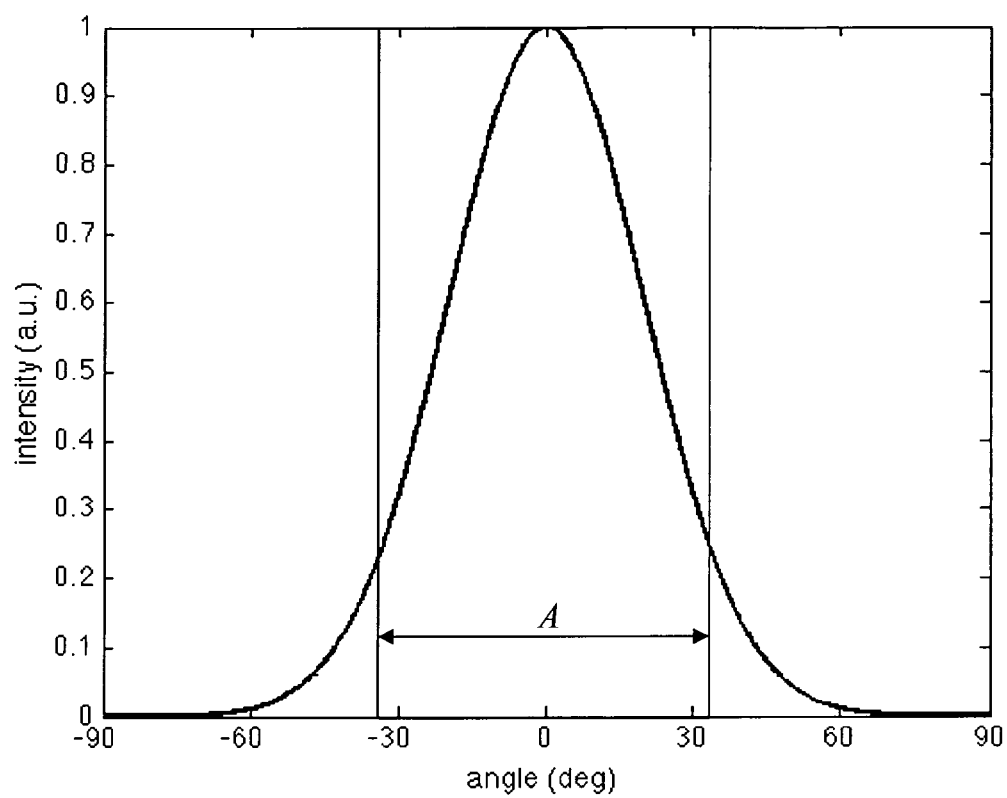
FIG. 3 is a typical Gaussian intensity profile of a prior art diffuser.
Figure 4:
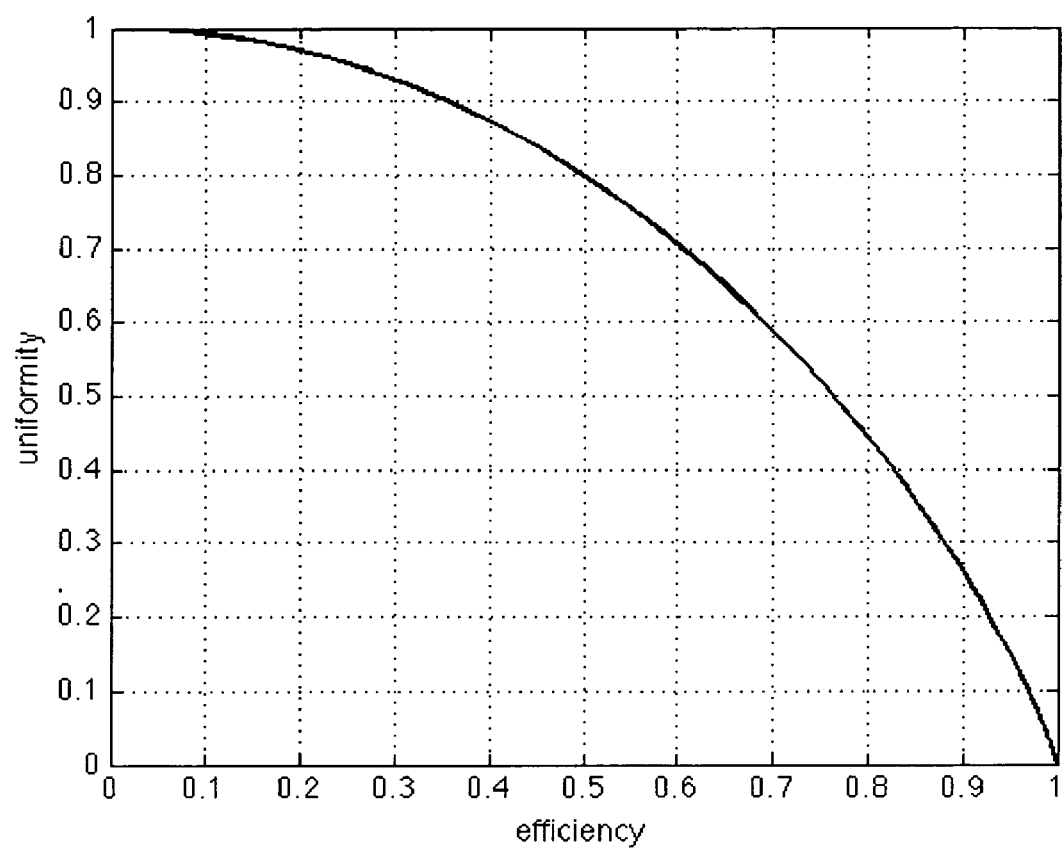
FIG. 4 is a graph of uniformity versus efficient of Gaussian intensity profile of FIG. 3 showing the general inverse relationship between uniformity and efficiency.

It can be stated that Gaussian scatter, such as that produced by ground glass or holographic diffusers, cannot provide high efficiency with good uniformity and vice-versa. To illustrate this point consider a Gaussian intensity profile in one-dimension for simplicity. A typical intensity profile is shown in FIG. 3. The region of interest A is bound by maximum angles±θ. The calculated efficiency and uniformity according to Eqs. (1) and (2) for a Gaussian intensity profile is shown in FIG. 4. In this case, if a uniformity of 0.9 or better is desired the efficiency is just under 35%. If the desired efficiency is at least 80% then the uniformity is no better than about 0.43.

Figure 5:
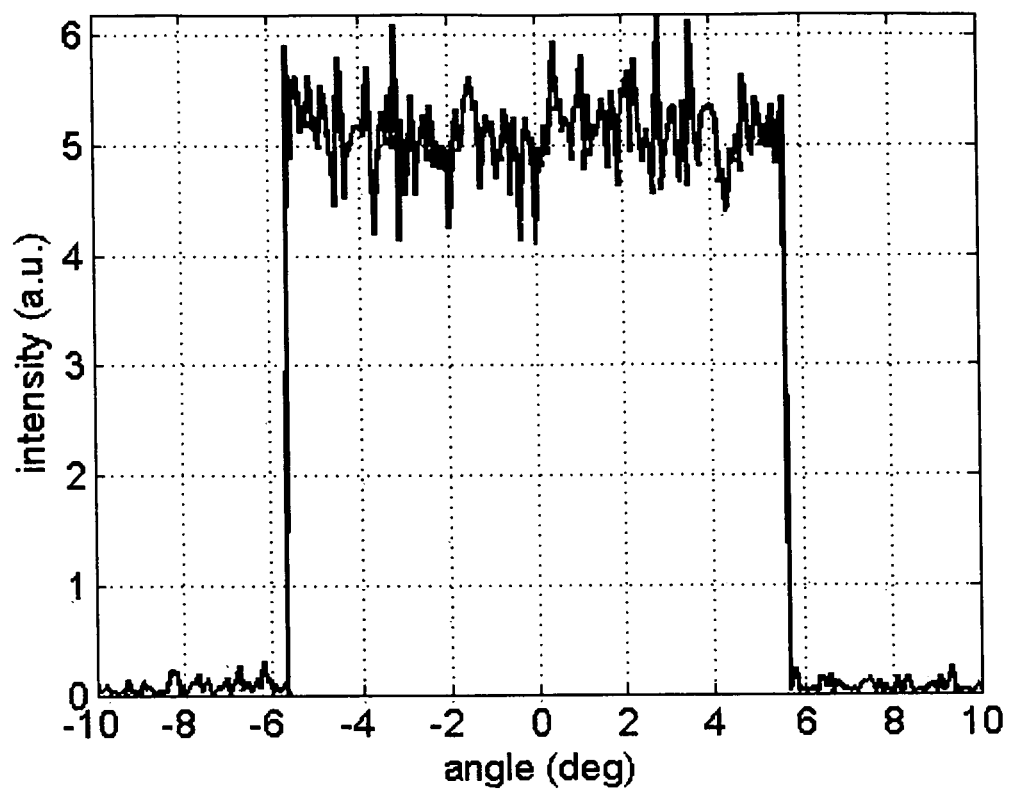
FIG. 5 is a graph of an intensity profile of a typical prior art diffractive diffuser.

Considering the case of a diffuser device that can in principle provide high efficiency with high uniformity, a diffractive diffuser, if the illumination is coherent and operates at a single wavelength. Further consider that a surface profile is necessary to produce a uniform circular pattern covering an angular range of 5 degrees. Features sizes of the diffractive diffuser depend on the divergence angles so that narrow angle diffusers require larger features and wide angle diffusers require smaller features. The scatter pattern is shown for example in FIG. 5 of a typical prior art diffractive diffuser which can provide a theoretical efficiency of 94%, disregarding surface (Fresnel) losses. Essentially all of the remaining 6% of lost energy outside the target angular region is due to higher-order diffraction components. A very small fraction is due to the scatter fall-off illustrated in FIG. 6, which shows a close-up of FIG. 5 in the angular range between about 5.15 and 5.35 degrees. For this particular design the beam size is about 0.5 mm and the design wavelength is 633 nm.

Microlens-based diffusers, such as those disclosed on U.S. Pat. Nos. 7,033,736 and 6,859,326, eliminate the zero-order issue and manufacturability challenges associated with producing diffusers with wide scatter angles. The microlens-based diffuser achieves a given divergence by means of slope angles so, while a diffractive diffuser constitutes a shallow pattern with fine features, the microlens-based diffuser is composed of variable depth features without an intrinsic feature size. The feature size is a design parameter which, as will be shown below, directly affects efficiency.

Figure 7:
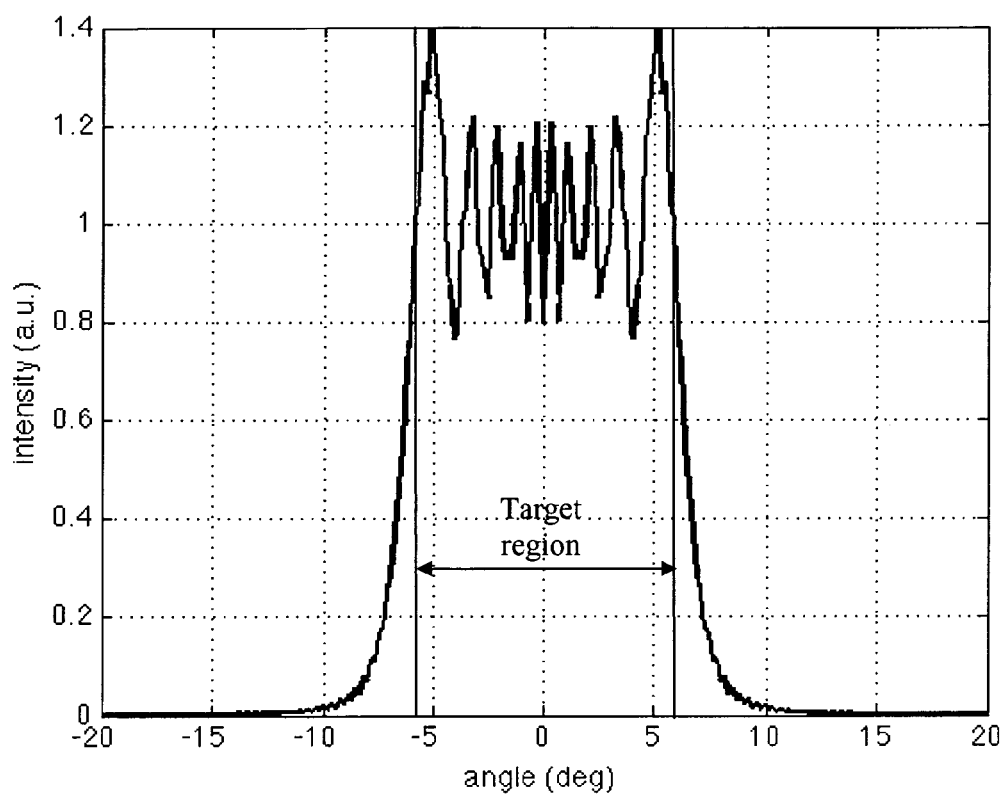
FIG. 7 is a graph of an intensity profile of a parabolic lens as an example of a prior art microlens diffuser.

To illustrate the basic principles of the microlens-based diffuser consider a parabolic lens element whose curvature or sag s is given by $$s = \frac{x^2}{2R}, \quad (3)$$

where R is the radius of curvature and D is the lens diameter so that $-D/2 \leqq x \leqq D/2$ (for simplicity a one-dimensional cylinder lens is assumed). The far-field intensity profile due to such a lens for $\phi=0$, except for some multiplicative terms is not relevant to this discussion, is given by $$I(\theta) = \frac{\lambda R}{2\Delta n}\left|\int_{-\sqrt{\frac{2\Delta n}{\lambda R}}\left(\frac{D}{2}+\frac{\theta R}{\Delta n}\right)}^{\sqrt{\frac{2\Delta n}{\lambda R}}\left(\frac{D}{2}-\frac{\theta R}{\Delta n}\right)} \exp\left(i\frac{\pi}{2}u^2\right)du\right|^2, \quad (4)$$

where $\lambda$ is the wavelength and $\Delta n = n(\lambda)-1$, with $n(\lambda)$ the index of refraction of the lens. There is no closed-form solution to Eq. (4) but the integral in the expression for $I(\theta)$ can be written in terms of the well-known Fresnel integrals for which there are efficient numerical calculation procedures. An example of a diffraction pattern for a single parabolic lens with $\lambda$=633 nm, n=1.56, D=100 μm, and R=227 μm is shown in FIG. 7. The oscillations seen across the diffraction pattern stem from the fact that Eq. (4) implicitly assumes a coherent incident beam. As one averages over a large number of lenses the single-lens oscillations turn into full-fledged speckle if the coherence area of the illumination is larger than the lens size or turn into a more uniform pattern if the coherence area is smaller than the lens size. In the coherent case one can consider a coarser grid that averages several speckles to obtain a global view of the intensity pattern.

Figure 6:
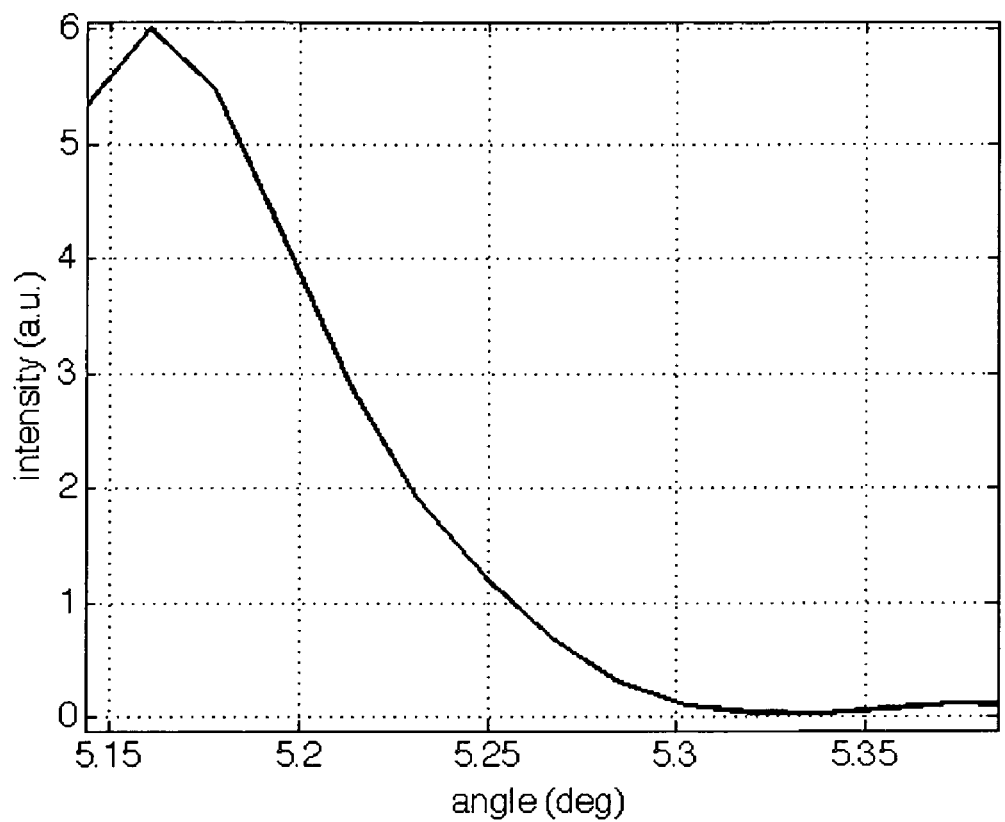
FIG. 6 is a more detailed view of the intensity profile of FIG. 7 along the transition region to show the fall off of intensity as angular range increases.

Using a randomized array of microlenses enables one to minimize the intensity oscillations and produce a more uniform distribution. The efficiency, however, is limited by extent of the fall-off region. In the example shown in FIG. 7 the target region is contained within ~5.5 degrees from the origin. The fall-off region represents energy outside of the target region, as seen in FIG. 7, and thus contributes to a reduction of the overall efficiency. Compare the intensity fall-off from the parabolic lens to that from a diffractive element, as illustrated in FIG. 6, and it is clear that the diffractive element is capable of much sharper scatter fall-off. This fact, however, does not necessarily imply higher efficiency because the parabolic lens has no higher diffraction orders as in the case of the diffractive element. As a result, while the diffractive element has sharp fall-off some of the energy is intrinsically lost to higher orders outside of the target region. On the other hand, the refractive element, such as a lens, has gentler fall-off but no higher diffraction orders and the efficiency loss is mostly on the fall-off. However, differently from the diffractive element where the fall-off is just dependent on the wavelength of the illumination and the size of the incident beam, for a refractive element the fall-off is determined mostly by the diameter of the lens, not of the incident beam. This becomes particularly relevant for a microlens-based diffuser where increasing the size of the illumination beam has negligible effect on the intensity fall-off, which is largely determined by the size of the individual lenslets that define the diffuser. If $w_f$ represents the width of the fall-off for a parabolic lens element, it is found that it scales with wavelength as $$w_f \sim D^{-1/2}, \quad (5)$$

so that to reduce the fall-off by half the diameter needs to increase by a factor of 4.

It seems clear, however, that the fall-off exhibited by the parabolic lens is not rooted on the relative simplicity of the profile. In fact, any microlens-based diffuser that relies on individual lens element that possesses rotational symmetry cannot provide any sharper fall-off than the parabolic lens. Assume that a certain lens has a general sag function s(r), which is expanded in a Taylor series as follows:

$$s(r) = a_2 r^2 + \sum_{k>2} a_k r^{2k}, \quad (6)$$

where the parabolic coefficient, $\alpha_2$, has been explicitly separated from the series expansion. The scatter pattern in the far-field is proportional to $$I \sim \left|\Im\left\{\exp\left[i\frac{2\pi}{\lambda}\Delta n s(r)\right]\right\}\right|^2, \quad (7)$$

where $\Im$ represents the Fourier transform operator. Since the Fourier transform of a product of functions equals the convolution of the Fourier transforms of the individual functions the equation becomes $$I \sim \left|\Im\left\{\exp\left[i\frac{2\pi}{\lambda}\Delta n a_2 r^2\right]\right\} \otimes \Im\left\{\exp\left[i\frac{2\pi}{\lambda}\Delta n \sum_{k>2} a_k r^{2k}\right]\right\}\right|^2, \quad (8)$$

with the operator $\otimes$ indicating the convolution operation. The first term in the convolution is related to the intensity pattern given by Eq. (4). Since the convolution operation tends to further spread the width of a given function, the intensity pattern for the general sag function s(r) produces a scatter pattern with fall-off that is no sharper than the parabolic profile. Therefore, a microlens-based diffuser composed of rotationally-symmetric lens elements, no matter how the sag function is defined, is at most as efficient as diffuser composed of parabolic lens elements and the above results regarding parabolic fall-off behavior and efficiency can be seen as an appropriate upper bound for microlens-based diffusers. If the condition of rotational symmetry is relaxed these results do not apply but it is not immediately apparent how to define a sag function that would, at least in principle, offer higher efficiency than that typical of a parabolic sag function.

Now considering the present invention, the lens structure has a sag function that is defined in a Cartesian coordinate system, in its simplest form by the following relation $$s(x,y) = \alpha x y, \quad (9)$$

with $\alpha$ a real constant. A central fact at the core of the present formulation is that the sag be defined over a generally rectangular aperture. Without loss of generality, however, we will consider a square edge size D in the discussion that follows.

Referring to FIG. 8, a perspective view of one type of optical element 20a of the present invention is shown have a substrate 21a of solid optically transparent material, such as glass or plastic, with a first surface 22a with a curvature in accordance with this sag profile s(x,y) of Eq. (9) providing structure 23a, and a second surface 24a that may be substantially flat. The substrate 21a may also be of a film layer with such saddle shaped structure. A contour map of the sag profile of structure 23a normalized to 1 is illustrated in FIG. 9, on a normalized square aperture 25. Because the geometric structure 23a is saddle shaped, a substrate 21a with the sag structure given by Eq. (9), and other variations to be introduced later, is referred to herein as a saddle lens. In the case of optical element 20a having a square boundary 29 when viewed from the top thereof, such optical element is referred to as square saddle lens 20a. A three-dimensional view of saddle lens 20a is shown in FIG. 10 where depth is normalized and indicated by degree of shading.

The saddle lens 20a exhibits remarkable behavior appropriate for beam shaping applications that require uniform illumination with high efficiency. Compared with the parabolic profile, the saddle lens 20a offers a much higher degree of uniformity and efficiency. Compared with diffractive solutions, the saddle lens offers higher efficiency without any of the issues associated with zero order or higher diffraction order loss.

Figure 11:
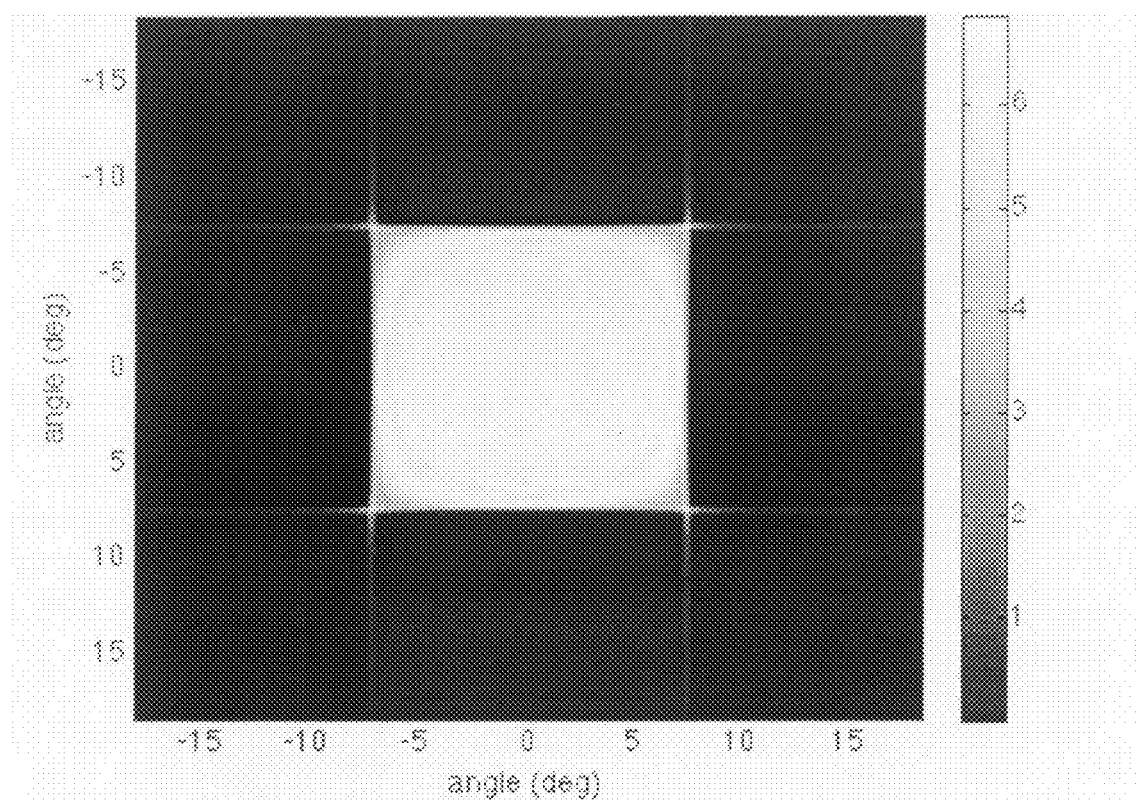
FIG. 11 is a plot of the light output distribution (e.g., scatter pattern) just above the surface for the saddle lens of FIG. 8 when illuminated from the surface opposite the structured surface.
Figure 12:
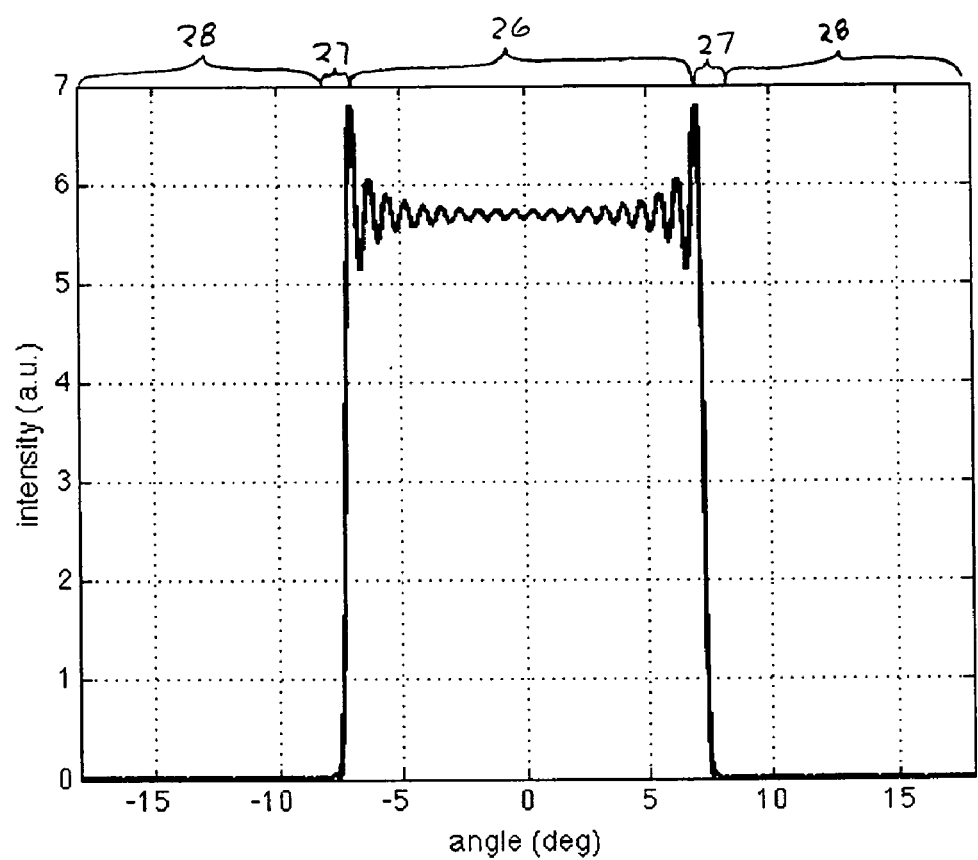
FIG. 12 is a graph of an intensity profile of a cross-section centrally through the scatter pattern of FIG. 11 showing the sharp cut off in the transitional region along the periphery of the target region and no light falls at angles beyond the transitional region.

A software modeled scatter profile from a single square saddle lens 20a of edge size D=100 µm and total depth equal to 20 µm is shown in FIG. 11. Such software for example, may be implemented by direct programming using a computer language, such as C, or by software such as Mathematica or Matlab. This plot assumes the wavelength to be 500 nm and the index of refraction to be 1.5. The bar code to the side indicates intensity in arbitrary units. A cross-section of the scatter is shown in FIG. 12 and reveals much better uniformity along target angular region 20 compared to the parabolic case. Even more interestingly, the saddle lens 20a diffraction exhibits much sharper fall-off then the parabolic profile such as in FIG. 7 for example. In FIG. 12, the target angular region is denoted at 26, the transitional region at 27, and region 28 at high angles with no illumination, as the angles increase from region 26 to region 28.

It is generally accepted that the diffraction-limited intensity fall-off, with its dependence in the form gλ/D for wavelength λ, aperture diameter D, and a parameter g that depends on the geometry of the aperture 25, is the sharpest fall-off possible so that any degree of aberration or pupil modification tends to widen the fall-off beyond this value. In some circumstances it is possible to alter the point spread function of an aperture to produce sharper fall-off than the diffraction limit, through techniques known as optical superresolution. See, for instance, the methods disclosed in U.S. Pat. No. 5,917,845. However, such methods inevitably lead to a reduction of the diffraction spot brightness and an, often severe, enhancement of sidelobe intensity. Such side effects render the use of superresolution techniques inappropriate for diffuser applications. Diffractive diffusers show a sharp diffraction-limited fall-off while a parabolic lens, on the other hand, exhibits considerably wider fall-off, as shown previously in connection with FIGS. 5 and 7. The fall-off is dependent on the elementary structures that compose the diffuser element. However, unexpectedly, the diffraction pattern produced by the saddle lens 20a produces a fall-off that is even sharper than the diffraction-limited case shown form example in FIG. 5. If one assumes that the sag function is given by Eq. (9), then the focal plane or far-field intensity is proportional to the Fourier transform of the element transmission function as follows $$I(\theta, \phi) \sim \left| \int_{-D/2}^{D/2} \int_{-D/2}^{D/2} e^{i\frac{2\pi}{\lambda}\Delta n \alpha xy} e^{-i\frac{2\pi}{\lambda}(\theta x + \phi y)} dx\,dy \right|^2, \quad (10)$$

assuming the thin-element approximation the transmission function can be written as a simple complex exponential of the phase delay. Solving the integral in x we are left with the following expression $$I(\theta) \sim \left| \int_{-D/2}^{D/2} \frac{\sin\frac{\pi D}{\lambda}(\Delta n \alpha y - \theta)}{\frac{\pi}{\lambda}(\Delta n \alpha y - \theta)} dy \right|^2, \quad (11)$$

for the cross-section φ=0. There is no closed form solution for the integral in Eq. (11) and to evaluate it numerical computation such as using a computer system is needed, such as provided by direct implementation using computer language such as C or by software such as Mathematica or Matlab.

Figure 13:
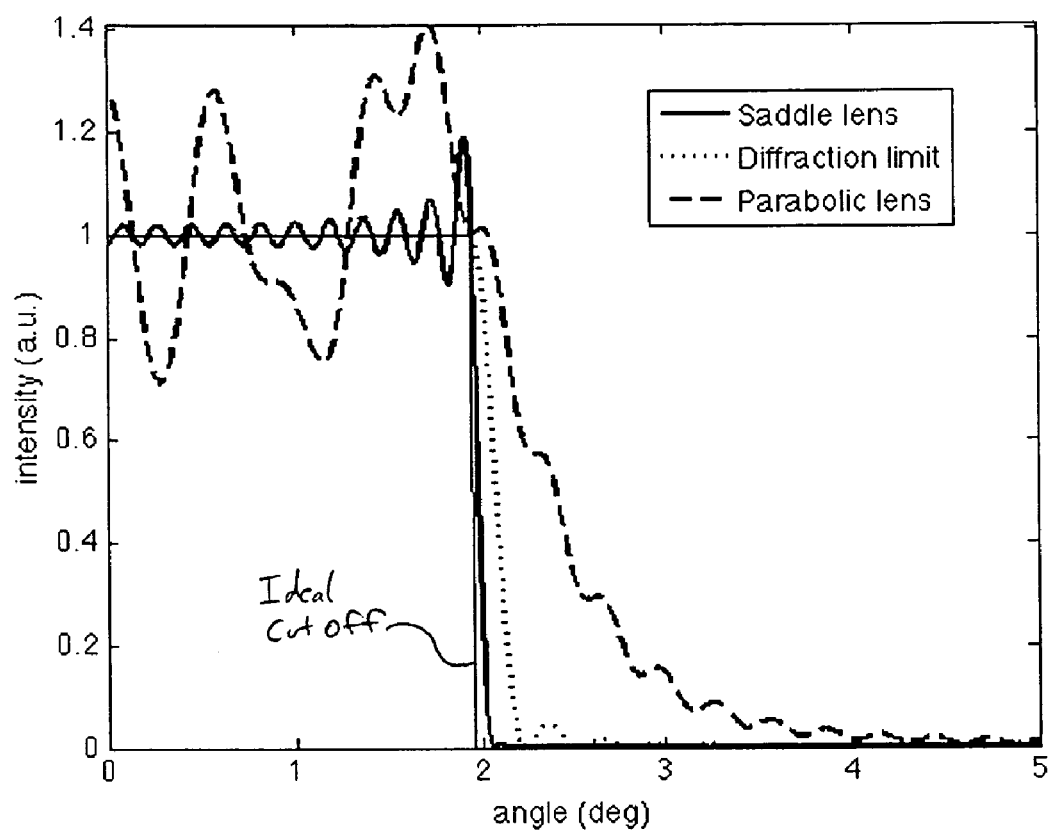
FIG. 13 is a graph of half of an intensity profile showing a comparison between the intensity profiles of the saddle lens of FIG. 8, a parabolic diffuser, and diffraction diffuser, all having the same pre-defined target angular region.
Figure 14:
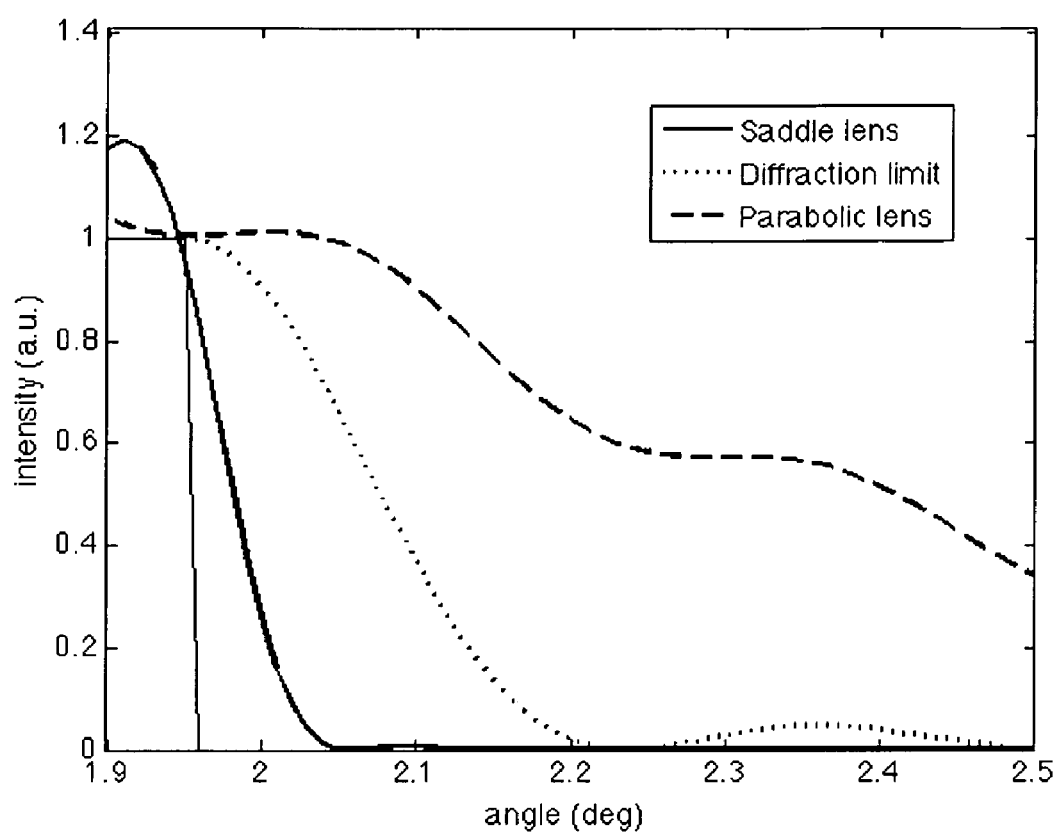
FIG. 14 is a graph of a more detailed view of the intensity profile of FIG. 13 in the transitional region where fall-off occurred in which the ideal fall off is illustrated to show that that saddle lens of the present invention provides an improved fall off.

Consider a single-lens element that scatters around ±2 degrees range with lens diameter or edge size D=100 µm. Parameter α for a saddle lens 20a equals 0.0014 µm$^{-1}$ while the radius of curvature for a parabolic lens equals 533.527 µm. Wavelength is λ=500 nm and index of refraction n=1.5. A cross-section of the calculated scatter is shown in FIG. 13 and provides a comparison between the fall-off due to a saddle lens 20a, and a prior art parabolic lens, and diffraction limit case. Note that, for this specific set of parameters, the parabolic lens is particularly inefficient while the fall-off due to the saddle lens 20a is sharper than the diffraction limit. This result is true in general. A close-up of the fall-off region is shown in FIG. 14. The saddle lens 20a thus incorporates all significant qualities for a highly efficient diffuser or beam shaper with high uniformity thereby providing an improved optical element for diffusing or shaping light enabling substantial uniform illumination along the target angular region. Contrary to conventional refractive lens-based elements, which quickly become inefficient as the diameter size decreases, the saddle lens 20a retains sub-diffraction-limited fall-off performance with high uniformity.

To generalize the equation for the saddle lens 20a the following is a general saddle lens sag profile ζ defined on a local Cartesian coordinate system so that $$\zeta(x,y) = \alpha X(x) Y(y) \text{sign}(x) \text{sign}(y), \quad (12)$$

where X and Y are functions of x and y, respectively, and sign(u) is defined as follows $$\text{sign}(u) = \begin{cases} +1, & \text{if } u > 0 \\ 0, & \text{if } u = 0 \\ -1, & \text{if } u < 0. \end{cases} \quad (13)$$

In the local coordinate system where the saddle lens is defined x belongs to the interval $-D_x/2 \leq x \leq D_x/2$ and y belongs to the interval $-D_y/2 \leq y \leq D_y/2$, where $D_x$ and $D_y$ denote the size of the rectangular aperture 25 along the x and y axis, respectively. An essential requirement for the general sag function ζ is that the effective power of function X(Y) be linear in x(y) for sufficiently small values of x(y). The effective power is defined as follows. If one expands function X(Y) in a Taylor series around the origin, the effective power is that of the first term in the series expansion. According to this requirement, the first term in the series must be linear in x(y).

Figure 15:
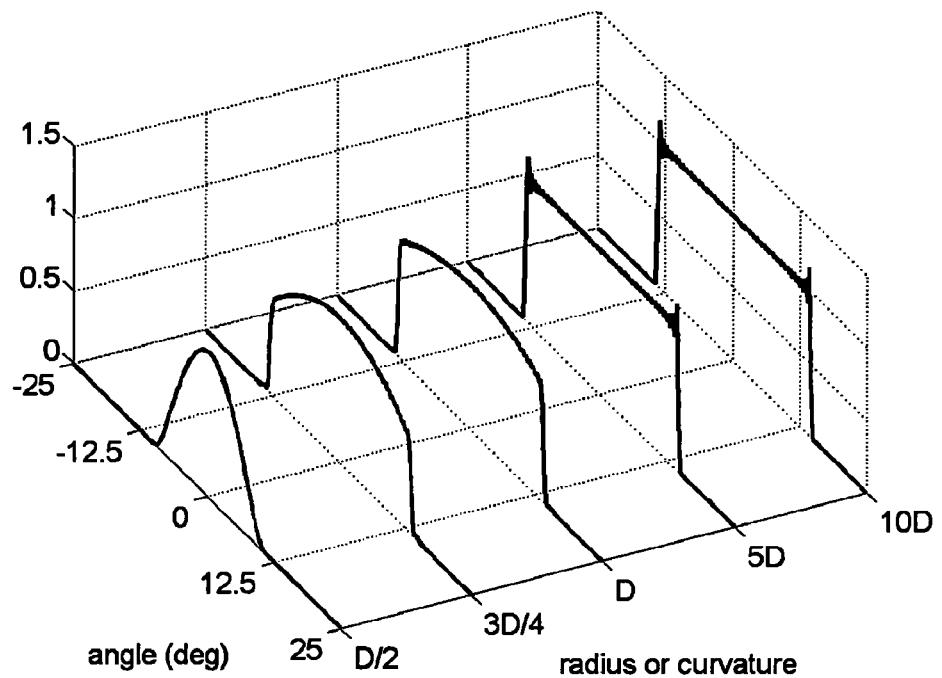
FIG. 15 is a three-dimensional graph of angle versus intensity over different diameter of the saddle lens of FIG. 8 to show the effect of varying radii of curvature on a realization of a saddle lens for which the conic constant is 0.
Figure 16:
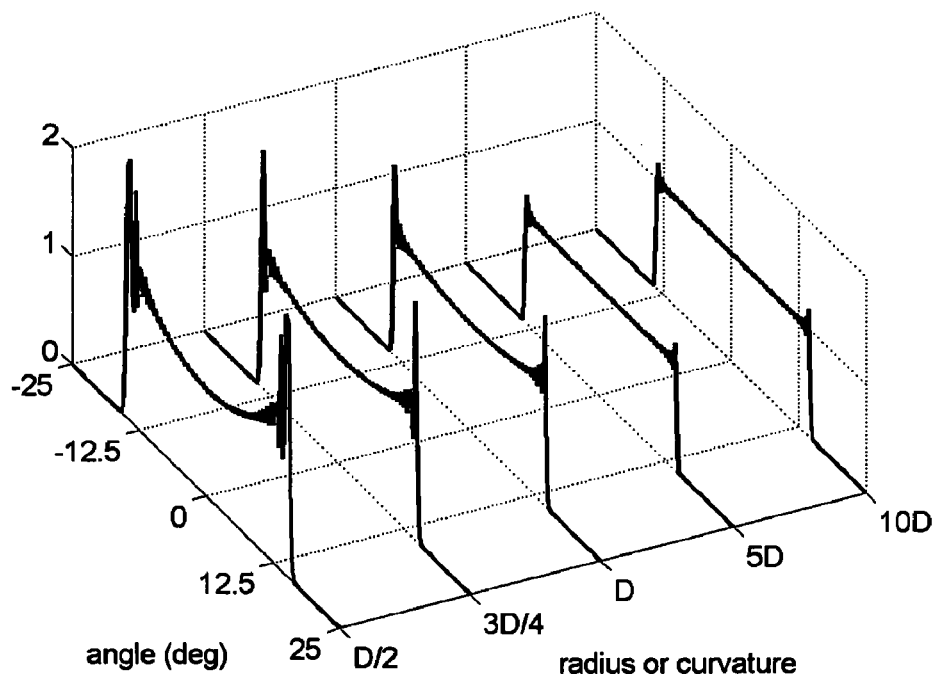
FIG. 16 is another three-dimensional graph of angle versus intensity over different diameter of the saddle lens of FIG. 8 to show the effect of varying radii of curvature on a realization of a saddle lens for which the conic constant is −2.

The introduction of the generalization expressed by Eq. (12) enables greater control of the diffraction pattern produced by the saddle lens 20a useful for diffuser applications where a generally non-periodic distribution of lens units are required over a certain area illuminated by an incident beam. Amongst the countless number of possible realizations of the general sag function ζ, for the sake of discussion, the following form is presented:

$$\varsigma_p(x, y) = \alpha \sqrt[p]{R_x - \sqrt[p]{R_x^p - (\kappa_x + 1)|x|^p}} \sqrt[p]{R_y - \sqrt[p]{R_y^p - (\kappa_y + 1)|y|^p}} \, \text{sign}(x) \, \text{sign}(y), \quad (14)$$

where α is a real constant, $R_x$ and $R_y$ denote radii of curvature, and $\kappa_x$ and $\kappa_y$ are conic constants, and p is a real. In the formulation given by Eq. (14) there is a total of 6 degrees of freedom available to control the diffraction pattern produced by the saddle lens. As an illustration, assume that p=2, $R_x=R_y=R$, $\kappa_x=\kappa_y=\kappa$ and $D_x=D_y=D$. FIG. 15 shows an example where κ=0 and the scatter pattern has its concavity altered by a suitable choice of the radius R. As the radius tends towards D/2 the pattern becomes less uniform towards a more convex shape with lower intensity towards the edge compared to the center. As D increases the uniform profile is restored. In FIG. 16 it is shown the case of κ=−2 where in the limit towards R=D/2 the pattern tends to a concave shape with higher intensity towards the edges compared to the center. Again, as D increases the uniform profile is restored. For this particular example D=100 μm and α=0.008. Negative values of conic constant cause the diffraction pattern to exhibit higher intensity towards the edge with an increasing value as the diameter is reduced. Positive values of conic constant, on the other hand, cause the diffraction pattern to exhibit lower intensity towards the edge with a decreasing value as the diameter is reduced. Thus, uniformity in the target region of saddle lens 20a increases with diameter which other parameters held constant.

A further generalization that introduces additional degrees of freedom can be written as follows $$\varsigma = \sum_p \alpha_p \varsigma_p, \quad (15)$$

where the expression for the sag involves a linear combination of saddle functions of the type given by Eq. (14) for a particular set of values p. In an even more general case, one may consider combinations of saddle functions that individually obey the basic relation given by Eq. (12).

It is interesting to note in regards to Eq. (14) is that if $\kappa_q > -1$, q=x, y, the radius $R_q$ has to satisfy the following relation $$R_q \geq \frac{D_q}{2} \sqrt[p]{(\kappa_q + 1)}, \quad (16)$$

to ensure a real value for the inner radicals in Eq. (14). On the other hand, if $\kappa_q < -1$ there is no restriction on the radius and the inner radicals are always real but the function on variable q is a pure imaginary. As long as both functions in x and y are both pure imaginary functions the product is real and the sag is thus real, a basic requirement for a physically realizable element.

Figure 17:
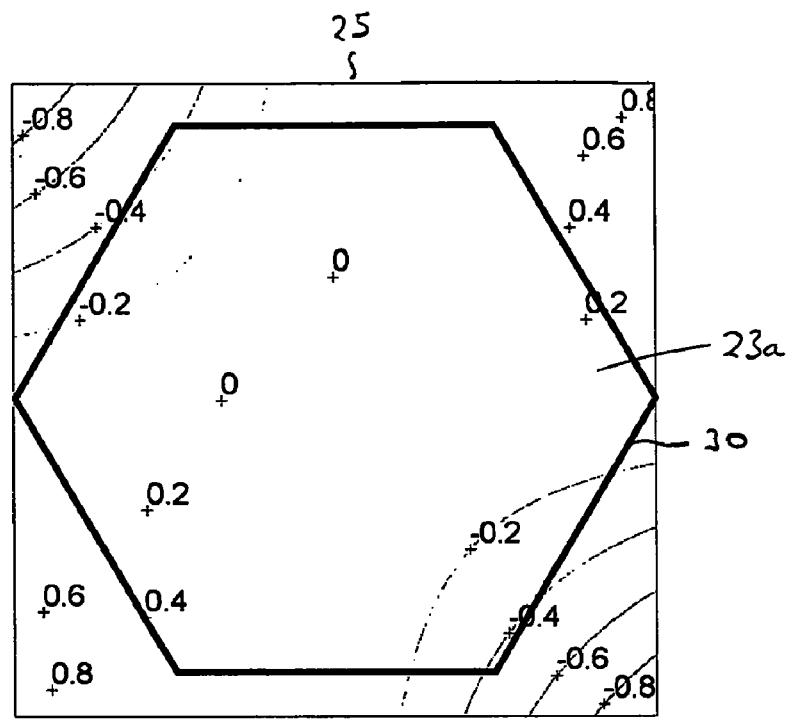
FIG. 17 is another contour plot for the saddle lens of FIG. 9 of the saddle shape structure of FIG. 8 showing an outline where the saddle structure may be a hexagonal subset region of the square or rectangular len's aperture to provide another type of saddle lens of the present invention.

Although the square, or generally rectangular, aperture 25 of saddle lens 20a is preferred to have the best sharp fall-off that characterizes the saddle lens, it may be convenient to also consider either a subset of the saddle lens 20a or an ensemble of elements that are subsets of the saddle lens. An example, FIG. 17, illustrates the case where only the subset of the saddle lens inside the indicated hexagon 30 is retained and the region outside the hexagon is ignored, thereby providing a hexagon saddle lens having such a subset as its saddle shaped structure. Another possible example is shown in FIG. 18 where the saddle lens has circular boundary 31, thereby providing a circular saddle lens having such a subregion as its saddle shaped structure. A further example, FIG. 19, shows a saddle lens with a more general or arbitrary boundary 32 of a subregion of the saddle lens 20a. As shown by FIGS. 17-19 different types of saddle lens are possible by utilizing a subregion within the original or base square aperture 25 of structure 23a. Although such subregions are centered about the aperture 25, subregions 33, 34, 35, 36 may be off-centered as shown in FIGS. 20A-D for any arbitrary shape and preferably include at least the origin or center of aperture 25.

As previously mentioned, the diffraction properties of the saddle lens 20a are affected if one considers a subset, such as indicated by regions 30-36, of the generally rectangular aperture 25. To illustrate the effect, consider as subregion or boundary 31 of a square saddle lens 20a of edge size D the circle of diameter D, as illustrated in FIG. 18. In this particular example, D=100 μm. A perspective view the optical element providing a circular saddle lens 20b with circular boundary 31 is shown in FIG. 21A, and three-dimensional view of the saddle lens is shown in FIG. 21B in which shading indicated depth. Saddle lens 20b has a substrate 21b of optically transparent material with a first surface 22b saddle shaped structure 23b, and a second surface 24b that may be substantially flat.

The scatter pattern for saddle lens 20b is shown in FIG. 22 for α=0.008, λ=500 nm, n=1.5 as calculated by lens modeling software. The scatter is more rounded because of the circular saddle lens 20b, but the sub-diffraction-limited fall-off is no longer observed and the scatter is not as uniform as for the square saddle lens 20a. A comparison of the intensity profile of circular and saddles lenses 20a and 20b is shown in FIG. 23. The spatial locations of curvature of the structures shown in the figures were numerically produced using optical design software such as Mathematica or Matlab on a computer, other software for designing optics may similar be used, in accordance with the equations described herein.

Multiple or aggregates of saddle lenses 20a, 20b, saddle lenses in accordance with subsets having regions 30, 32-36, or saddle lens with other centered or off-centered regions may be provided along a substrate surface in periodic or non-periodic arrangements. In a periodic arrangement, there is an identifiable unit that repeats across the substrate. In the non-periodic (random) arrangement there is no such basic repeating unit. FIG. 24 shows a configuration where a single saddle lens unit 20a is repeated (depth is normalized to one). FIG. 25 shows another periodic arrangement of saddle lenses 20a where every other lens is flipped to eliminate the discontinuity seen at the edge of every saddle lens in FIG. 24, thereby providing a continuous surface. The scatter patterns of periodic arrangement of saddle lens of FIGS. 24 and 25 are shown in FIGS. 26 and 27, respectively. To determine the patterns shown in FIGS. 26 and 27, a small 2×2 arrangements of the periodic arrays in FIGS. 24 and 25 were simulated using computer software, where each saddle lens 20a, defined according to Eq. (9), had edge size D=100 µm and α=0.004, λ=500 nm, n=1.5.

For diffuser applications, however, a periodic arrangement gives rise to highly structured scatter patterns, as illustrated in FIGS. 26 and 27, which are unsuitable for light homogenization. In this case, one requires a distribution of saddle lenses or subsets of saddle lenses that is non-periodic so that the resulting scatter pattern shows no discernible structures. If the illumination has a significant degree of coherence, such as a laser source for instance, the scatter pattern will present speckle. In this case one requires that the speckle pattern be devoid of discernible structures constituting a substantially random pattern.

To produce a homogeneous light distribution pattern the elementary saddle lenses 20a, or subregions thereof as described above, that compose the an optical element for diffusing light needs to be randomly distributed on the substrate surface. The spatial placement of lenses as well as the specific design parameters for each lens unit preferably varies across the substrate surface so that there is no repeating unit as is typical of a periodic arrangement. An example of a random arrangement of saddle lenses 20a is shown in FIG. 28. Another example using circular saddle lenses 20b with subset or subregion 31 (FIG. 18) is shown in FIG. 29. In both cases the depth is normalized to one, as indicated by the bar code to the right of each figure. The specific design parameter varied in these examples was the aperture size or D of the structures which provide variations in light distribution in the target region along different structures as shown for example in FIG. 16. The random spatial placement and variation in size of the structures may be determined with the aid of a computer system using software described earlier.

In creating general arrangements of saddle lenses 20a or subsets thereof, another parameter may be introduced which adds a constant sag value to at least some units in the aggregate, as follows $$\zeta_v = \zeta + v, \quad (17)$$

where $v$ constitutes a real number constant over the defining aperture 25 of the saddle lens or subset thereof and is taken from a certain range from a minimum to a maximum value with specific probability function. For diffuser applications where homogeneous light distribution is required the probability distribution is preferably uniform.

A further modification of the saddle lenses or subsets thereof in creating general arrangements involves rotations of the local coordinate frame where at least some units in the aggregate has a sag function that obeys the relation $$\zeta_R = \zeta[\mathcal{R}(x,y,z)], \quad (18)$$

where $\mathcal{R}$ denotes a rotation operator acting on the local (x,y,z) reference frame where the saddle lens or subset thereof is calculated. The rotation may take place with respect to an arbitrary axis or may involve a finite sequence of rotations with respect to different axis. A particular arrangement used to produce round scatter, utilizes saddle lenses rotated around the z axis, perpendicular to the substrate, by an angle between 0 and π/2 with uniform probability distribution. FIGS. 30A, 30B, 30C shows an example of an optical element 20c having a random arrangement of multiple square shapes structures 23a used in optical element 20a along a surface 22c along substrate 21c. In this example of an aggregate lens, optical element 20c has the structures 23a that are at random spatial locations, random rotation, and are each of unique parameter (s) in that the curvature of each structure is different from other structures. To provide such unique parameter(s), the diameter (or size) of each of the structures may be uniquely varied, as shown in the example of FIG. 16, to provide different degrees or levels of substantial uniform light in the target angular region. Such target angular region being defined generally at or within the two cutoff regions on each side of their respective intensity profiles. Other non-circular saddle lenses having saddle structures comprises subsets of saddle structure 23a may similarly be randomly arranged along a substrate surface. For example, a subregion array (periodic) composed of hexagonal saddle lenses 30 (FIG. 17) may be provided along a substrate, or to provide more uniform diffuse light such hexagonal saddle lenses are distributed in a non-periodic (random) fashion along a substrate.

To produce optical elements providing saddle lens 20a and saddle lens with a subset thereof, or aggregates of saddle lenses 20a or subsets thereof (periodic or random), a surface-relief pattern needs to be produced in accordance with the desired curvature along a structure in accordance with the desired type of optical element. Preferably, fabrication methods to produce a saddle lens array include multi-mask exposure, grayscale masks, and single-point laserwriting. Other methods may enable fabrication of the structures such as direct machining with a diamond tooling machine or even gradient-index materials, but other methods may be used, including molding from a master having a mirror of the desired surface-relief structure(s) onto a substrate of optical material. However, the first three methods offer presently available fabrication capability for single saddle lenses as well as aggregates.

Grayscale masks involve encoding the desired profile with a mask that presents variable transmission/attenuation as a function of position. When photosensitive resist is exposed through this mask it creates a continuous relief profile whose depth is directly related to the local attenuation of the mask. After development, locations of high (low) attenuation lead to shallow (deep) structures in resist. An approach to this process is described, for example, in U.S. Pat. No. 5,285,517.

Single-point laserwriting is described, for example, in U.S. Pat. No. 6,410,213, and utilizes a focused laser beam to expose photosensitive resist that has been coated on a substrate. The laser beam is modulated as it scans the substrate so that after development one obtains a continuous analog surface. The substrate itself may be flat, curved, or have any convenient shape—it is the exposure of the focused beam and the continuous exposure of overlapping energy as the beam is scanned that creates a smooth continuous analog surface.

Optionally, the curvature or sag function of saddle lenses 20a or subsets thereof, periodic or random, may be provided by a diffractive grating or other diffractive optics FIG. 31B represents the saddle lens function as previously disclosed in such as diffractive form, that is, the saddle lens function under a modulo-2 mπ operator, for m a natural number. To generate the diffractive form of the saddle lens 20a, the phase delay at a given wavelength λ, is determined as follows $$\Phi(x, y) = \frac{2\pi}{\lambda} \Delta n \varsigma(x, y), \quad (17)$$

where $\Delta n = n(\lambda) - n_0(\lambda)$, with $n(\lambda)$ the index of refraction at wavelength $\lambda$, and $n_0(\lambda)$ the index of the medium, typically air so $n_0 = 1$. For each point $(x,y)$ the diffractive form is then calculated by taking the phase $\Phi$ modulo-$2m\pi$ meaning that $$\Phi_{diffractive} = \Phi (\bmod\ 2m\pi) = \Phi - m2p\pi, \quad (20)$$

where m is the largest integer such that $\Phi \leq q2p\pi$. The usual diffractive form is obtained for m=1. The diffractive form quantized to four levels is shown in FIG. 31C and quantized to two levels is shown in FIG. 31D. For purposes of comparison, FIG. 31A shows a top view of the non-diffractive continuous surface of saddle lens 20a. Such diffractive forms may utilize multi-mask exposure in which the saddle structure profiles are quantized into a certain number of levels. The various depth levels are created by successive exposure of binary masks. This requires precise alignment of such binary masks. See, for instance, U.S. Pat. No. 5,218,471 for more information on multi-mask exposure.

Optical elements or devices with a substrate with randomly arranged multiple saddle lens of square, circular or other subsets thereof, as described above, may be utilized to provide an efficient diffuser along a sheet (flat or curved) of optical material for architectural illumination, displays, backlighting, solid-state lighting, or signage, or other application where light diffusion and/or homogenization is desired. Optical elements or devices with one or more saddle lens of square, circular or other subsets thereof, as described above along their substrates may also be used in illumination systems for beam shaping, or desired tailoring of illumination.

The term substrate as used herein defines any body of optical material, such as glass, plastic, or film, which is sufficient in thickness onto which saddle shapes structure(s) or subset(s) thereof, may be formed to provide the desired diffusion, redistribution, or shaping of light. Accordingly, the overall thickness between substantially flat surfaces 24a, 24b, 24c and the structured surfaces 22a, 22b, and 22c, of optical elements 20a, 20b, and 20b, respectively, is illustrative, as other thicknesses may be used.

From the foregoing description, it will be apparent that there have been provided optical elements for efficiently diffusing or shaping light using saddle shaped structures. Variations and modifications in the herein described optical elements and devices using same in accordance with the invention will undoubtedly suggest themselves to those skilled in the art. Accordingly, the foregoing description should be taken as illustrative and not in a limiting sense.

The invention claimed is:

1. An optical element for efficiently diffusing or shaping light comprising:
    a substrate having a surface with at least one saddle shaped structure, wherein said saddle shaped structure represents a subset region of a saddle shape.

2. The optical element according to claim 1 wherein said subset region is of a geometric shape.

3. The optical element according to claim 1 wherein said subset region is of an arbitrary shape.

4. The optical element according to claim 1 wherein said subset region is centered in said aperture of said lens.

5. The optical element according to claim 1 wherein said subset region is off centered said aperture of said lens.

6. An optical element for efficiently diffusing or shaping light comprising:
    a substrate having a surface with at least one saddle shaped structure, wherein a plurality of ones of said saddle shaped structure are arranged randomly along said substrate.

7. The optical element according to claim 6 wherein said plurality of ones of said saddle shaped structure differ in curvature from each other.

8. The optical element according to claim 6 wherein said plurality of ones of said saddle shaped structure are arranged randomly by spatial location in which one or more overlap each other.

9. The optical element according to claim 6 wherein said plurality of ones of said saddle shaped structure are non-circular and are arranged randomly by spatial location and rotation.

10. An optical element for efficiently diffusing or shaping light comprising:
    a substrate having a surface with at least one saddle shaped structure, wherein said saddle shaped structure curvature is defined by sag $\varsigma$ by an equation:

$$\varsigma_p(x, y) = \alpha \sqrt[p]{R_x - \sqrt[p]{R_x^p - (\kappa_x + 1)|x|^p}} \sqrt[p]{R_y - \sqrt[p]{R_y^p - (\kappa_y + 1)|y|^p}}\ \mathrm{sign}(x)\mathrm{sign}(y),$$

where x and y are two orthogonal dimensional along the substrate, $\alpha$ is a real constant, $R_x$ and $R_y$ are radii of curvature in x and y dimensions, respectively, and $\kappa_x$, and $\kappa_y$ are conic constants in x and y dimensions, respectively, and p is a real number.

11. The optical element according to claim 10
wherein said saddle shaped structure provides substantially uniform scatter pattern or distribution of light along an angular range when light is received by the optical element incident another surface of the substrate.

12. The optical element according to claim 10 wherein said another surface is substantially smooth.

13. The optical element according to claim 10 wherein the substantial uniformity of said scatter pattern or distribution increases with diameter of said saddle shaped structure.

14. The optical element according to claim 10 wherein said optical element is efficient in accordance with sharpness along a transitional region of fall off in intensity of the diffused light along a periphery of said angular range, and substantial absence of diffused light along angles beyond said transitional region.

15. The optical element according to claim 10 wherein said structure operates over one or more wavelengths or ranges of light.

16. The optical element according to claim 10 wherein said saddle shaped structure represent an aperture of a lens defining an outer boundary of the structure when viewed normal to said surface.

17. The optical element according to claim 10 wherein said outer boundary is of a geometric shape other than square or rectangular.

18. The optical element according to claim 10 wherein a plurality of ones of said saddle shaped structure are arranged periodically along said substrate.

19. The optical element according to claim 16 wherein said outer boundary is a square or rectangular.

20. An optical element for efficiently diffusing or shaping light comprising:
a substrate having a surface with at least one saddle shaped structure, wherein said saddle shaped structure provides substantially uniform scatter pattern or distribution of light along an angular range when light is received by the optical element incident another surface of the substrate, wherein said outer boundary is of an arbitrary shape.

21. The optical element according to claim 14 wherein said sharpness of fall off provided by said shaped structure is greater than diffusing optical elements utilizing a non-diffractive non-saddle shaped structure.

22. An optical device comprising:
a body of optical material having a surface; and
a plurality of saddle shaped structures or subsets thereof along said surface capable of diffusing or shaping light incident said body, wherein said plurality of saddle shaped structures or subsets thereof provides substantially uniform distribution of light along an angular range in response to light incident said body, wherein said saddle shaped structure curvature is defined by sag $\zeta$ by an equation:

$$\varsigma_p(x, y) = \alpha \sqrt[p]{R_x - \sqrt[p]{R_x^p - (\kappa_x + 1)|x|^p}}$$
$$\sqrt[p]{R_y - \sqrt[p]{R_y^p - (\kappa_y + 1)|y|^p}} \text{ sign}(x) \text{ sign}(y),$$

where x and y are two orthogonal dimensional along the substrate, $\alpha$ is a real constant, $R_x$ and $R_y$ are radii of curvature in x and y dimensions, respectively, and $\kappa_x$, and $\kappa_y$ are conic constants in x and y dimensions, respectively, and p is a real number.

23. The optical device according to claim 22 wherein said saddle shaped structures or subsets thereof are in a periodic arrangement along said surface.

24. An optical device comprising:
a body of optical material having a surface; and
a plurality of saddle shaped structures or subsets thereof along said surface capable of diffusing or shaping light incident said body, wherein said saddle shaped structures or subsets thereof are at random spatial locations along said surface.

25. The optical device according to claim 22 wherein said saddle shaped structures or subsets thereof are non-circular and are arranged at one of periodic or random rotation from one another along said surface.

26. An optical device comprising:
a body of optical material having a surface; and
a plurality of saddle shaped structures or subsets thereof along said surface capable of diffusing or shaping light incident said body, wherein one or more of said saddle shaped structures or subsets thereof are different in curvature from each other and overlap along said surface.

27. The optical device according to claim 22 wherein said body is a sheet.

28. The optical device according to claim 22 wherein said surface represents a first surface and said body comprises a second surface opposite said first surface through which said incident light is received.

* * * * *